US007831991B1

(12) United States Patent
Kiraly

(10) Patent No.: US 7,831,991 B1
(45) Date of Patent: Nov. 9, 2010

(54) METHOD AND SYSTEM FOR ENSURING CONTINUOUS DATA FLOW BETWEEN RE-TRANSMITTERS WITHIN A CHAINCAST COMMUNICATION SYSTEM

(75) Inventor: Jozsef Kiraly, San Martin, CA (US)

(73) Assignee: ChainCast, Inc., San Jose, CA (US)

( * ) Notice: Subject to any disclaimer, the term of this patent is extended or adjusted under 35 U.S.C. 154(b) by 0 days.

(21) Appl. No.: 11/094,555

(22) Filed: Mar. 29, 2005

Related U.S. Application Data

(63) Continuation of application No. 09/300,784, filed on Apr. 27, 1999, now Pat. No. 6,901,604, which is a continuation-in-part of application No. 09/253,117, filed on Feb. 19, 1999, now Pat. No. 7,610,607.

(51) Int. Cl.
*H04N 7/06* (2006.01)
(52) U.S. Cl. .................. 725/96; 725/93; 725/116; 725/118; 709/219; 709/231
(58) Field of Classification Search ........... 725/86–104, 725/127, 131; 709/117–231
See application file for complete search history.

(56) References Cited

U.S. PATENT DOCUMENTS

| 3,651,471 | A | 3/1972 | Haselwood et al. |
| 5,235,599 | A | 8/1993 | Nishimura et al. |
| 5,377,327 | A | 12/1994 | Jain et al. |

(Continued)

FOREIGN PATENT DOCUMENTS

| EP | 0851364 | 4/1997 |
| WO | 9748051 | 12/1997 |
| WO | 99/03216 | 1/1999 |
| WO | 9938266 | 7/1999 |

OTHER PUBLICATIONS

DeJesus, Edmund X., "How the Internet Will Replace Broadcasting", BYTE Magazine, US McGraw-Hill Inc., St. Peterborough, vol. 21, No. 2, Feb. 1, 1996, pp. 51-54, 56, 60, 62 and 64.
Press Release, "Progressive Networks Launches the First Commercial Audio-on-Demand System over the Internet," Apr. 10, 1995.
Notice of Allowance, Mail Date Apr. 1, 2009; U.S. Appl. No. 09/253,117; CNCT-P006.CPA.
Furht, et al., IP Simulcast: A New Technique for Multimedia Broadcasting Over the Internet, Copyright Sep. 1998, pp. 245-254; Journal of Computing and Information Technology.
Notice of Allowance, Mail date Jun. 11, 2009; U.S. Appl. No. 09/253,117.

*Primary Examiner*—Annan Q Shang

(57) ABSTRACT

A method and system for performing chaincast communication to multiple communication systems (e.g., computer systems) within a system of coupled electronic devices (e.g., the Internet). The present invention provides a system wherein a broadcast source communicates primary broadcast information (e.g., encoded audio radio content, encoded audio/video television content, etc.) to a first group of electronic devices. The first group of electronic devices can be instructed by a chaincast manager to then communicate (e.g., forward or re-transmit) the broadcast information to other electronic devices which devices can also be instructed to communicate to more devices, etc., thereby reducing the bandwidth requirements of the communication channel between the broadcast source and the first group of electronic devices. The chaincast manager, coupled to the Internet, is used to track and manage which devices are forwarding broadcast information to which other devices. The chaincast manager is also used to monitor the packet rates between the electronic devices. In response to the packet rates falling below a predetermined threshold value, the transmission re-routes communications to provide better communication load sharing across the system. The chaincast communication system may also include a number of secondary broadcast servers for broadcasting secondary information content (e.g., advertisement, emergency information, community information, etc.) to be rendered independently of the primary broadcast information content.

20 Claims, 19 Drawing Sheets

U.S. PATENT DOCUMENTS

| | | | |
|---|---|---|---|
| 5,377,329 A | 12/1994 | Seitz | |
| 5,455,569 A | 10/1995 | Sherman et al. | |
| 5,459,719 A | 10/1995 | Hayashi | |
| 5,522,044 A | 5/1996 | Pascucci et al. | |
| 5,550,978 A | 8/1996 | Takahashi | |
| 5,559,933 A | 9/1996 | Boswell | |
| 5,574,898 A | 11/1996 | Leblang et al. | |
| 5,583,994 A | 12/1996 | Rangan | |
| 5,590,118 A | 12/1996 | Nerderlof | |
| 5,634,011 A | 5/1997 | Auerbach et al. | |
| 5,673,031 A | 9/1997 | Meier | |
| 5,706,431 A | 1/1998 | Otto | |
| 5,761,416 A | 6/1998 | Mandal et al. | |
| 5,761,433 A | 6/1998 | Billings | |
| 5,778,187 A | 7/1998 | Monteiro et al. | |
| 5,781,551 A | 7/1998 | Born | |
| 5,784,615 A | 7/1998 | Lipe et al. | |
| 5,790,958 A | 8/1998 | McCoy et al. | |
| 5,793,974 A | 8/1998 | Messinger | |
| 5,793,980 A | 8/1998 | Glaser et al. | |
| 5,805,825 A | 9/1998 | Danneels et al. | |
| 5,818,906 A | 10/1998 | Grau et al. | |
| 5,825,772 A | 10/1998 | Dobbins et al. | |
| 5,850,396 A | 12/1998 | Gilbert | |
| 5,852,714 A | 12/1998 | Tseng et al. | |
| 5,854,892 A | 12/1998 | Liu et al. | |
| 5,872,981 A | 2/1999 | Waddington et al. | |
| 5,884,031 A * | 3/1999 | Ice | 709/203 |
| 5,933,829 A | 8/1999 | Durst et al. | |
| 5,948,070 A | 9/1999 | Fujita et al. | |
| 5,949,411 A | 9/1999 | Doerr et al. | |
| 5,956,716 A * | 9/1999 | Kenner et al. | 1/1 |
| 5,987,525 A | 11/1999 | Roberts et al. | |
| 5,990,881 A | 11/1999 | Inoue et al. | |
| 6,002,836 A | 12/1999 | Inoue et al. | |
| 6,006,257 A | 12/1999 | Slezak | |
| 6,012,086 A | 1/2000 | Lowell | |
| 6,014,669 A | 1/2000 | Slaughter et al. | |
| 6,018,710 A | 1/2000 | Wynblatt et al. | |
| 6,023,733 A | 2/2000 | Periasamy et al. | |
| 6,075,543 A | 6/2000 | Akeley | |
| 6,081,840 A | 6/2000 | Zhao | |
| 6,084,510 A | 7/2000 | Lemelson et al. | |
| 6,105,145 A | 8/2000 | Morgan et al. | |
| 6,119,163 A | 9/2000 | Monteiro et al. | |
| 6,122,259 A * | 9/2000 | Ishida | 370/260 |
| 6,141,680 A | 10/2000 | Cucchiara | |
| 6,147,695 A | 11/2000 | Bowen et al. | |
| 6,157,377 A * | 12/2000 | Shah-Nazaroff et al. | 715/719 |
| 6,173,399 B1 * | 1/2001 | Gilbrech | 713/153 |
| 6,175,861 B1 | 1/2001 | Williams et al. | |
| 6,175,871 B1 * | 1/2001 | Schuster et al. | 709/231 |
| 6,185,598 B1 * | 2/2001 | Farber et al. | 709/200 |
| 6,185,619 B1 * | 2/2001 | Joffe et al. | 709/229 |
| 6,189,039 B1 | 2/2001 | Harvey et al. | |
| 6,195,680 B1 | 2/2001 | Goldszmidt et al. | |
| 6,211,901 B1 * | 4/2001 | Imajima et al. | 725/93 |
| 6,222,821 B1 | 4/2001 | Sees et al. | |
| 6,230,196 B1 * | 5/2001 | Guenthner et al. | 709/223 |
| 6,246,672 B1 | 6/2001 | Lumelsky | |
| 6,248,946 B1 | 6/2001 | Dwek | |
| 6,256,675 B1 * | 7/2001 | Rabinovich | 709/241 |
| 6,256,704 B1 | 7/2001 | Hilava et al. | |
| 6,272,523 B1 * | 8/2001 | Factor | 709/201 |
| 6,275,937 B1 | 8/2001 | Hailpern et al. | |
| 6,314,094 B1 | 11/2001 | Boys | |
| 6,349,329 B1 | 2/2002 | MacKintosh et al. | |
| 6,349,349 B1 | 2/2002 | Fujita et al. | |
| 6,377,972 B1 | 4/2002 | Guo et al. | |
| 6,393,468 B1 | 5/2002 | McGee | |
| 6,400,407 B1 | 6/2002 | Zigmond et al. | |
| 6,408,435 B1 | 6/2002 | Sato | |
| 6,421,726 B1 * | 7/2002 | Kenner et al. | 709/225 |
| 6,434,622 B1 * | 8/2002 | Monteiro et al. | 709/231 |
| 6,449,653 B2 | 9/2002 | Klemets et al. | |
| 6,463,075 B1 | 10/2002 | Hoebeke | |
| 6,463,454 B1 | 10/2002 | Lumelsky et al. | |
| 6,529,960 B2 * | 3/2003 | Chao et al. | 709/238 |
| 6,587,127 B1 | 7/2003 | Leeke et al. | |
| 6,600,719 B1 * | 7/2003 | Chaudhuri | 370/228 |
| 6,606,482 B1 | 8/2003 | Wheeler | |
| 6,611,872 B1 | 8/2003 | McCanne | |
| 6,622,171 B2 | 9/2003 | Gupta et al. | |
| 6,628,625 B1 | 9/2003 | Birdwell et al. | |
| 6,636,896 B1 | 10/2003 | Philyaw | |
| 6,643,707 B1 | 11/2003 | Booth | |
| 6,691,312 B1 * | 2/2004 | Sen et al. | 725/96 |
| 6,738,983 B1 * | 5/2004 | Rao et al. | 725/120 |
| 6,747,692 B2 | 6/2004 | Patel et al. | |
| 6,799,221 B1 * | 9/2004 | Kenner et al. | 709/245 |
| 6,810,526 B1 * | 10/2004 | Menard et al. | 725/46 |
| 2002/0184339 A1 | 12/2002 | Mackintosh et al. | |
| 2003/0149988 A1 | 8/2003 | Ellis et al. | |

* cited by examiner

METHOD AND SYSTEM FOR ENSURING CONTINUOUS DATA FLOW BETWEEN RE-TRANSMITTERS WITHIN A CHAINCAST COMMUNICATION SYSTEM

RELATED US APPLICATION

This patent application is a Continuation of co-pending, commonly-owned patent application Ser. No. 09/300,784, filed on Apr. 27, 1999, entitled "METHOD AND SYSTEM FOR ENSURING CONTINUOUS DATA FLOW BETWEEN RE-TRANSMITTERS WITHIN A CHAINCAT COMMUNICATION SYSTEM", by Jozsef Kiraly, which is incorporated herein by reference, which is a continuation-in-part of co-pending U.S. patent application Ser. No. 09/253,117, filed on Feb. 19, 1999, and entitled "Chaincast Method and System for Broadcasting Information to Multiple Systems within the Internet," by Jozsef Kiraly, and assigned to the assignee of the present invention, which is incorporated herein by reference.

BACKGROUND OF THE INVENTION

1. Field of the Invention

The present invention relates to the field of digital information communication. More specifically, the present invention relates to the field of computer implemented digital broadcast communication of information over the Internet.

2. Related Art

The Internet is a large network made up of a number of smaller networks. It is made up of more than 100,000 interconnected networks in over 100 countries, comprised of commercial, academic and government networks. It has become commercialized into a worldwide information highway and data base, containing information on virtually every subject known to humankind.

The proper and efficient use of the great amount of information available on various Internet sites has the potential of providing Internet users with a variety of information desired for businesses and individuals. In particular, those users interested in certain segments of the information available on the Internet or those users interested in certain specific Internet sites could benefit tremendously from having their specific information of interest available to them in an automated and interesting manner. Moreover, such users would benefit greatly from being constantly and automatically updated on new information as the new information becomes available on their sites of interest.

Due to the prevalence and popularity of the World Wide Web (also called the "Web") servers around the world, a great number of Internet users are particularly interested in receiving updated information of interest to them from various World Wide Web servers on the Internet. By way of background, the World Wide Web is an Internet facility that links documents locally and remotely. The Web document is called a Web page, and links in the page let users jump from page to page (hypertext) whether the pages are stored on the same server or on servers around the world. The pages are accessed and read via a Web browser such as Netscape Navigator or Microsoft Internet Explorer.

The Web has become the center of Internet activity because, among other reasons, Web pages, containing both text, graphics and multi-media content are easily accessible via a Web browser. The Web contains the largest collection of online information in the world, and the amount of information is increasing. Current schemes for accessing a Web document require typing in the URL (Uniform Resource Locator) address of the home page in the Web browser. From there, the user starts "surfing" through the Internet via hypertext links to other documents that can be stored on the same server or on a server anywhere in the world.

The shear size of the information available on the Internet and the Web has made it a necessity for individuals and businesses to efficiently and constantly sift through the available information in order to find and organize the information that is of interest. More importantly, it is crucial for content providers to efficiently and effectively transmit their information to those desiring to receive the information. Stated differently, individuals and businesses realize that the availability of information itself does not result in a competitive edge unless the information can be efficiently sent from the content provider to the receiver and further unless the information is of interest and of value to the business or the individual.

FIG. 1 illustrates a system 70 regarding one use of the Internet. In system 70, the Internet 40 is used to provide a communication channel between a broadcast source 60 (e.g., a Web server) and a number of receiving devices (e.g., Web browsers) or "users" 10, 12, 14. A digital broadcast signal, e.g., representing some audio/video/multi-media content or program such as a radio program or television program, can be broadcast in encoded digital packets from the source server 60 to the receivers 10, 12, 14. Although the digital broadcast content is the same for each receiver, a separate communication stream, comprising separate digital data packets, is required for each receiver that is coupled to the Internet. Therefore, three separate communication streams 20, 21 and 22 are shown as being broadcast directly from server 60 onto the Internet 40. Stream 20 is identified and communicated for receiver 10, stream 21 is identified and communicated for receiver 12 and stream 22 is identified and communicated for receiver 14. Further, the users 10, 12, 14 have to visit the Web site providing the audio/video/multi-media content in order to establish the communication streams 20, 21, 22.

As a result of the above, it is clear that the number of users (receivers) that can receive broadcast information on the Internet simultaneously from one server 60 is limited mainly by the connection speed of the connection between the server 60 and the Internet 40 because each stream 20, 21, 22 consumes available bandwidth. For example, assuming it is desired to broadcast a radio program over the Internet to users, e.g., that visit the web site of the server 60 (FIG. 1). Depending on the compression algorithm used, and on the number of users that want to listen to the program simultaneously, the server 60 needs to be connected to the Internet 40 with a speed of at least N×K bytes/s, where K is the bandwidth requirement for one user and N is the number of users able to listen to the program simultaneously. Assuming the server connection to the Internet 40 allows up to 1.5 Mbit/s bandwidth, the number of listeners will be limited to roughly 300 per server, assuming roughly 5 Kbits/s bandwidth requirement per user.

Although this figure appears large, in reality the bandwidth of the connection hardware between the server 60 and the Internet 40 actually imparts a substantial limitation to the number of receivers that can simultaneously receive content from the server. While more sophisticated connections with higher bandwidths can be used, this substantially increases the costs associated with providing the content from the server 60 to the receivers 10, 12 and 14.

Accordingly, what is needed is a cost effective method of providing content to many users pseudo-simultaneously over the Internet. What is further needed is a method and system that is able to provide broadcast communication content to many users, pseudo simultaneously, without being limited to the bandwidth constraints of the server to Internet connection. The present invention provides such a solution.

SUMMARY OF THE DISCLOSURE

A method and system are described herein as an embodiment of the present invention for implementing an Internet radio device for receiving and/or transmitting audio information over the Internet. The Internet radio device can be implemented as a stand alone electronic radio device which is coupled to the Internet or the Internet radio device can be implemented as a software package operable on a host computer system which is coupled to the Internet. In either case, the Internet radio device does not require a browser for interfacing with other Internet transmitters ("Internet radio station transmitters"). The Internet radio includes a graphical user interface (GUI) with which a user can interface in order to receive audio radio programming from an Internet radio station transmitter. The radio device receives a list of Internet radio station transmitters that are registered with a chaincast manager (CCM), also coupled to the Internet. The GUI renders this list to the user. The user can sort or select from this list based on desired language, country, or station names. To hear a radio program, a user can select a station from this list. Data received by a radio device can be retransmitted in chaincast mode from the radio device to other radio devices that want to listen to the same radio program.

Using the chaincast broadcasting architecture, described below, a primary information transmitter (PIT) within the CMM manages the flow of digitally encoded audio information from the Internet radio station transmitters to and among the coupled Internet radio devices. Specifically, the CMM manages the communication links between the Internet radio station transmitters (e.g., primary broadcast servers) and the radio devices and manages the communication links between Internet radio stations performing chaincasting.

In Ham radio mode, one radio device can select another radio device to be the "radio station," in which case a communication channel is opened between the radio devices so that voice and/or other digitally encoded information (e.g., video, HTML documents, Web pages, multi-media, etc.) can be exchanged between the radio devices. In this mode, the GUI contains a "transmit" button or key. Using the chaincast broadcasting architecture, described below, each radio device acts as a primary broadcast server to communicate information to an associated radio device. In Ham radio mode, a listing of radio devices can be shown in the radio GUI, in an analogous fashion as radio station listings are displayed. A user can then select a listed radio device with which to communicate.

A method and system is also described herein for a chaincast broadcasting architecture which performs chaincast communication to multiple communication systems within a system of coupled electronic devices. In one implementation the electronic devices can be computer systems and the system of coupled electronic devices includes the Internet. The present invention provides a system wherein a broadcast source communicates primary digital broadcast information (e.g., encoded audio radio content, encoded audio/video television content, etc.) to a first group of electronic devices. The first group of electronic devices can be instructed by a chaincast manager to then communicate (e.g., forward or re-transmit) the broadcast information to other electronic devices which devices can also be instructed to communicate to more devices, etc., thereby reducing the bandwidth requirements of the communication channel between the broadcast source and the first group of electronic devices. The communication is "chaincast" because the forwarding from one device to another, to another, etc., creates a logical communication "chain" originating from the broadcast server and traversing to and through the receiving devices. The resulting communication is pseudo-simultaneous with respect to the receiving devices due to the slight delay introduced in buffering and retransmitting the broadcast content from device to device, etc.

A computer implemented chaincast manager, coupled to the Internet, is used to track and manage which devices are forwarding broadcast information to which other devices. In order to ensure continuous data flow along the communication "chains," the chaincast manager is also used to monitor the packet rates between the electronic devices. In response to the packet rates falling below a pre-determined threshold value, the chaincast manager re-routes communications between the devices to provide better communication load sharing across the system and to provide more efficient content communication between the devices.

According to one embodiment of the present invention, the chaincast communication system may include a number of primary broadcast servers for broadcasting primary information content (e.g., radio programs, TV programs, multi-media content, etc.). The chaincast communication system may also include a number of secondary broadcast servers for broadcasting secondary information content (e.g., advertisement, emergency information, community information, etc.) to be rendered independently of the primary broadcast information content. Users of the electronic devices of the present chaincast communication system can select from one of these primary broadcast servers from which they desire to receive primary broadcast information. In one embodiment, the content of the secondary broadcast information the users receive is determined by the chaincast manager. In another embodiment, users of the present chaincast communication system can select a general subject matter that they desire to receive as the secondary broadcast information.

According to the present invention, an electronic device for re-transmitting or forwarding broadcast information may be a computer system configured for receiving and re-transmitting broadcast information to other electronic devices. The electronic device may include a re-transmission buffer for temporarily holding data packets received from an upstream device before rendering and for temporarily holding data packets after rendering for subsequent re-transmission to another electronic device. The electronic device also monitors a number of unrendered data packets stored therein. When the number of unrendered data packets falls below a threshold level, the electronic device signals the near empty condition to the chaincast manager such that a different upstream re-transmitter can be assigned to supply information to the electronic device.

Embodiments of the present invention include the above and further include a communication system comprising: a plurality of information receiver and retransmitter devices (IRRTs) coupled to the Internet wherein each IRRT is for receiving and rendering broadcast information and for selectively retransmitting the broadcast information to another IRRT; a plurality of primary broadcast servers coupled to the Internet, each for originating respective primary broadcast information that is chaincast among a group of IRRTs of said plurality of IRRTs; a plurality of secondary broadcast servers coupled to the Internet and each for originating respective secondary broadcast information that is chaincast among a group of IRRTs of the plurality of IRRTs; and a chaincast manager coupled to the Internet and for registering the plurality of primary and secondary broadcast servers and for scheduling information transfers of the respective primary broadcast information to IRRTs based on broadcast requests generated by the IRRTs to the chaincast manager.

DETAILED DESCRIPTION OF THE INVENTION

Figure 1:
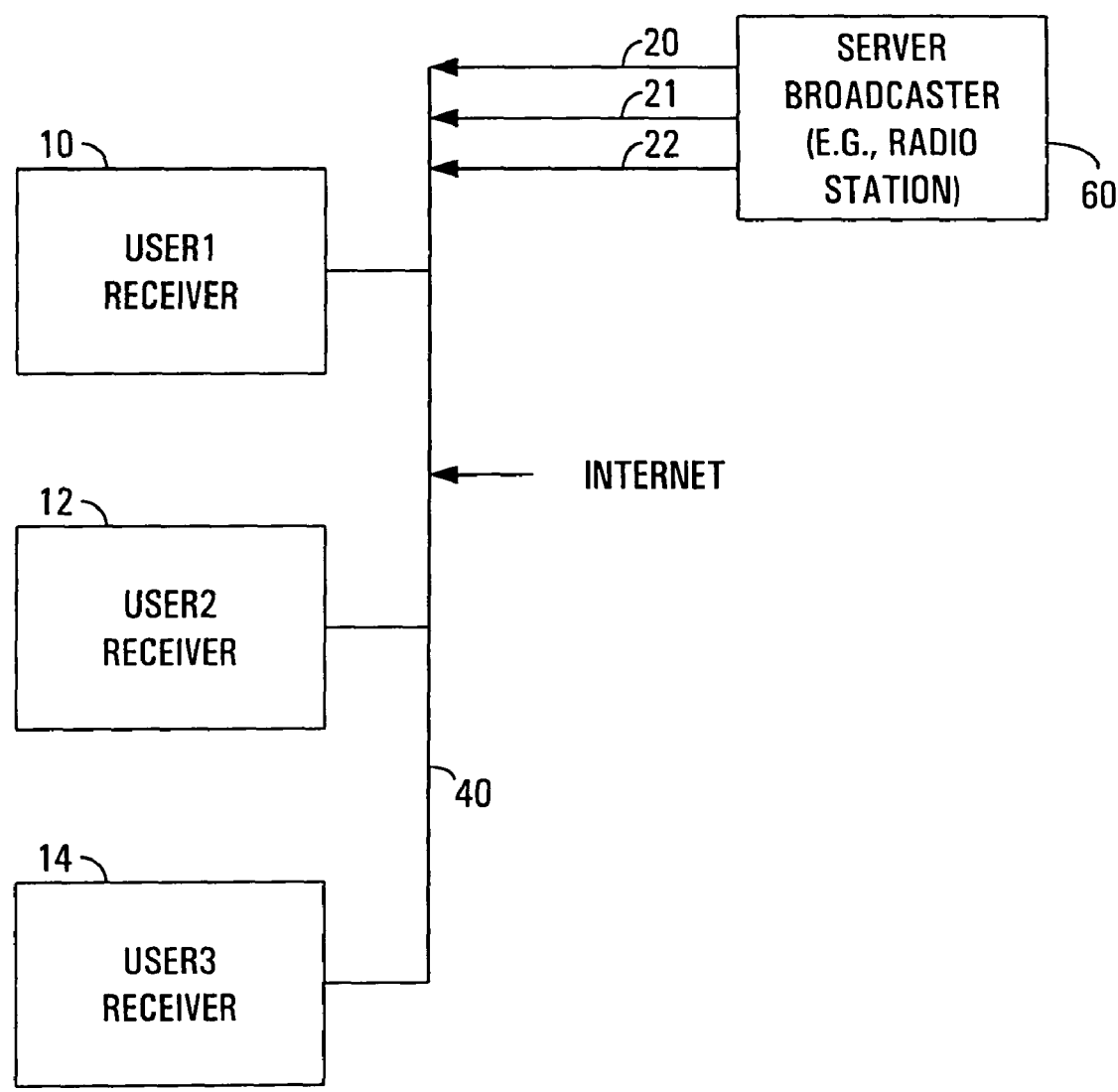
FIG. 1 illustrates a prior art information broadcast system using the Internet.

In the following detailed description of the present invention, a chaincast system and method, including an Internet radio device, for communicating digital broadcast content to multiple users, pseudo simultaneously, without being constrained to the bandwidth of the server-to-Internet connection, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer System 112

Aspects of the present invention, described below, are discussed in terms of steps executed on a computer system. Aspects of the present invention are also discussed with respect to an Internet system including electronic devices and servers coupled together within the Internet platform. A "server" and an "electronic device" or "user" can be implemented as a general purpose computer system. Although a variety of different computer systems can be used with the present invention, an exemplary computer system 112 is shown in FIG. 2.

In general, computer systems 112 that can be used by the present invention comprise an address/data bus 100 for communicating information, a central processor 101 coupled with the bus for processing information and instructions, a volatile memory 102 (e.g., random access memory) coupled with the bus 100 for storing information and instructions for the central processor 101 and a non-volatile memory 103 (e.g., read only memory) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Also included in computer system 112 is an alphanumeric input device 106 including alphanumeric and function keys coupled to the bus 100 for communicating information and command selections to the central processor 101. Generally, alphanumeric input device 106 is called a keyboard or keypad. System 112 also includes a cursor control or directing device 107 coupled to the bus for communicating user input information and command selections to the central processor 101. The cursor directing device 107 is typically displaced through user movement which causes a cursor image displayed on screen 105 to move accordingly. Within the context of the present invention, the cursor directing device 107 can include a number of implementations including a mouse device, for example, a trackball device, a joystick, a finger pad (track pad), an electronic stylus, an optical beam directing device with optical receiver pad, an optical tracking device able to track the movement of a user's finger, etc., or any other device having a primary purpose of moving a displayed cursor across a display screen based on user displacements. Computer system 112 also includes a microphone 109 for receiving voice inputs.

Figure 2:
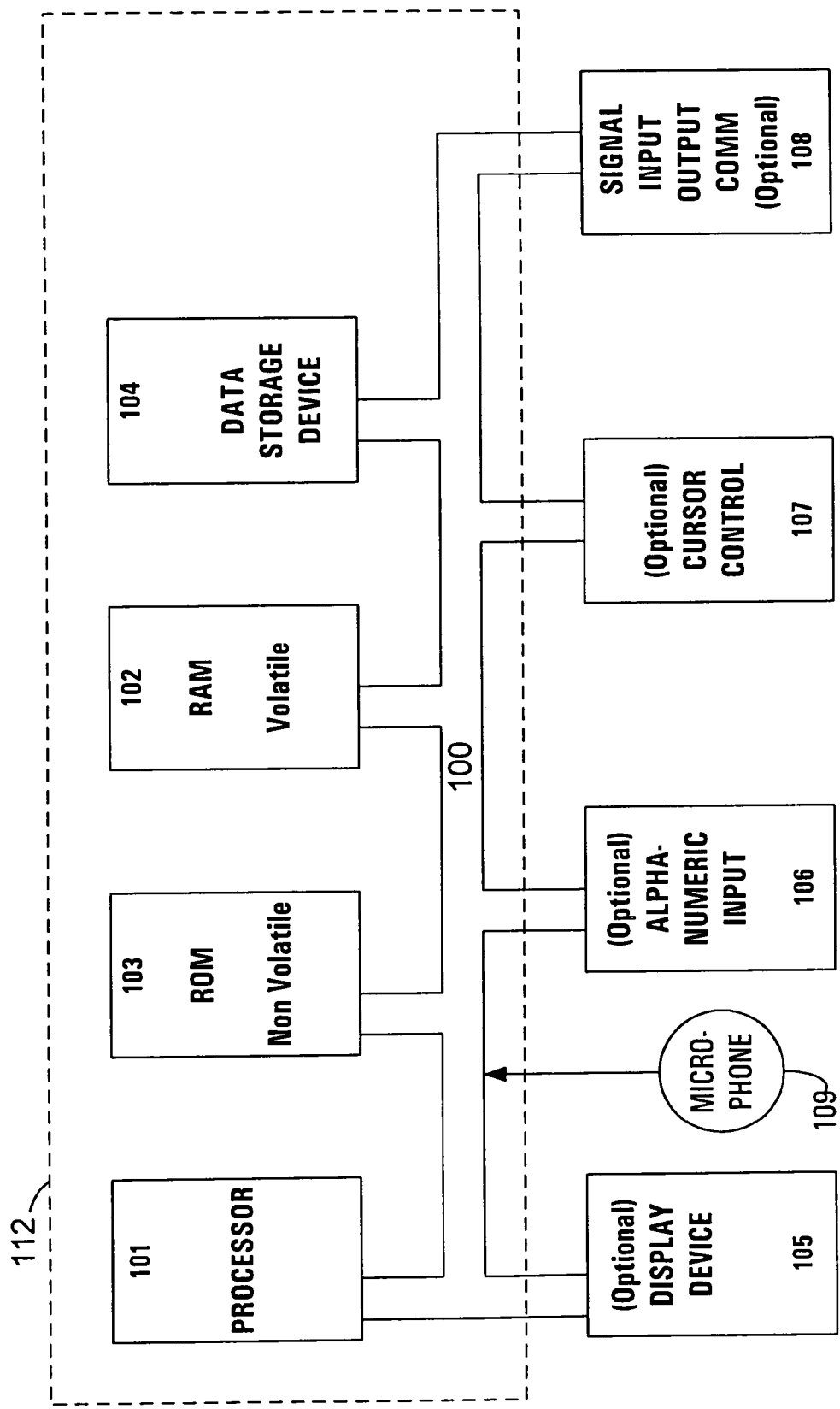
FIG. 2 illustrates a general purpose computer system which can be used as an electronic device, a user, or a server in accordance with the present invention.

Computer system 112 of FIG. 2 can also include an optional signal generating device 108 coupled to the bus 100 for interfacing with other networked computer systems, e.g., over the Internet. The display device 105 of FIG. 2 utilized with the computer system 112 of the present invention may be a liquid crystal device, other flat panel display, cathode ray tube, or other display device suitable for creating graphic images and alphanumeric characters recognizable to the user. In one embodiment of the present invention, computer system 112 could be a Windows Operating System based computer system having an x86 architecture processor 101, or an Apple Operating System based Macintosh computer, for example.

Chaincast Communication of the Present Invention

Figure 3A:
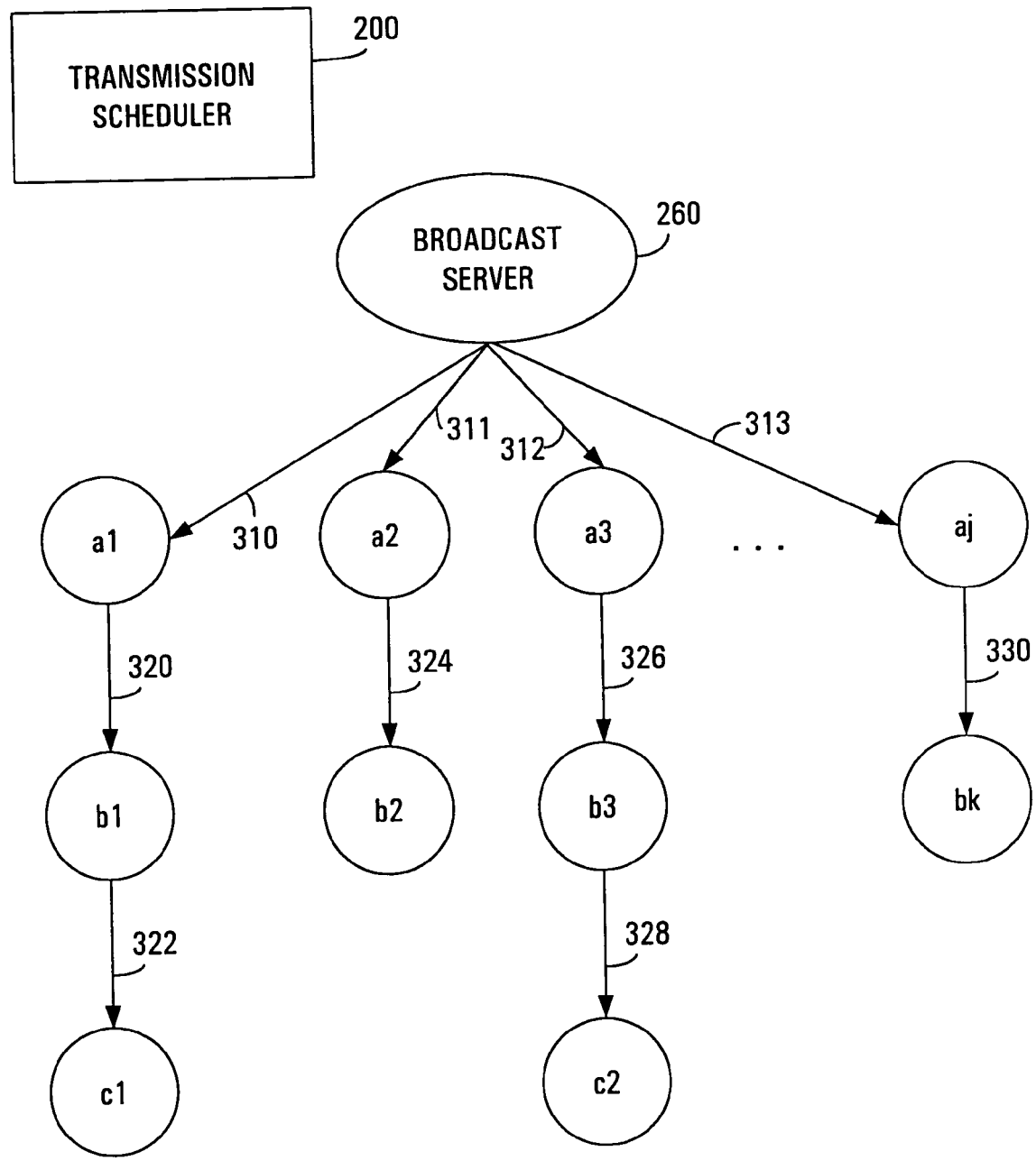
FIG. 3A is an exemplary communication diagram of the chaincast communication method of the present invention.

FIG. 3A illustrates an exemplary configuration in accordance with the present invention for performing "chaincast" communication within the Internet system. Within FIG. 3A, a broadcast server 260 supplies a broadcast content that a number of electronic devices a1-aj, b1-bk, c1 and c2 (coupled to the Internet) desire to receive "pseudo" simultaneously. This broadcast content can be of any nature or character that would be desired to be received by a number of users simultaneously, e.g., an encoded audio program (e.g., a radio program), an encoded audio/visual program (e.g., a television program), an instructional seminar, a software program, an HTML document, multimedia content, etc. The broadcast content is typically encoded into individual data packets and broadcast digitally. The digital broadcast content is received pseudo-simultaneously because of the small latencies involved in buffering and retransmitting the broadcast content between various electronic devices of FIG. 3A.

The chaincasting method of the present invention does not require a high speed connection between the broadcast server 260 and the Internet 300 (FIG. 4) and still allows practically an unlimited number of users to receive and render the same digitally broadcasted program. The chaincasting method can be applied to any kind of information broadcasting, including radio and television (TV), Web-content and other information. For simplicity, a radio program is described herein as an example of broadcast content. However, it should be appreciated that audio/visual and/or other multimedia content could also be used as the digital broadcast.

The present invention, instead of transmitting the information to many users directly from a server, causes the server to transmit the information directly only to a few users (e.g., a1-aj of FIG. 3A) and then instructs these few users to forward (or "retransmit" or "relay") the information to the other users (e.g., b1-bk, c1 and c2) as needed. This is chaincasting. The present invention changes the paradigm of information providers and information consumers because all users can relay information to others thereby reducing the communication burden on the server-to-Internet connection. Instead of the old paradigm, the present invention creates an information sharing community (FIG. 3A) that utilizes the Internet resources optimally. Chaincasting causes a logical chain of the same broadcast signal from the broadcast server 260 to other electronic devices and then to other electronic devices, etc.

In the example of FIG. 3A, users a1-aj receive the broadcast content directly from the broadcast server 260 via separate information streams 310-313, which are supported on the bandwidth resources of the connection hardware situated between the Internet 300 (FIG. 4) and server 260. These streams each contain digital encoded packets that make up the digital broadcast content. In one example, the broadcast content represents a radio program and is therefore digital encoded audio information. The number of users, j, is set based on the bandwidth supported by the connection hardware located between the Internet 300 (FIG. 4) and server 260. Users a1-aj are instructed, by the computer-implemented transmission scheduler 200, to respectively forward the broadcast content to users b1-bk in the fashion shown in FIG. 3A. For instance, a separate stream 320 is used between users a1 and b1; a separate stream 324 is used between users a2 and b2; a separate stream 326 is used between users a3 and b3; and a separate stream 330 is used between users aj and bk. Users b1 and b3 are instructed, by the transmission scheduler 200, to forward again the broadcast content to users c1 and c2 in the fashion shown in FIG. 3A. A separate stream 322 is used between users b1 and c1 and a separate stream 328 is used between users b3 and c2.

Logical communication "chains" are formed in this communication architecture, e.g., chain1 is a1-b1-c1; chain2 is a2-b2; chain3 is a3-b3-c2 and chain4 is aj-bk. Software loaded within each user can be used to provide the forwarding functionality which is controlled by the transmission scheduler 200.

Each user of FIG. 3A, registers with the transmission scheduler 200 which maintains and tracks the communication links established between the users. The transmission scheduler 200 load balances between the users so that the communication load is balanced to reduce transmission latencies. Load balancing can be performed to maintain uniform chain sizes. For example, if one user is supplying retransmissions to a relatively larger number of other users (e.g., a chain size of four), then some of the receiver users can be moved from this chain such that they receive the information from other established chains. It is possible for one user to receive broadcast information from more than one other user; the duplicate data can be ignored.

Figure 3B:
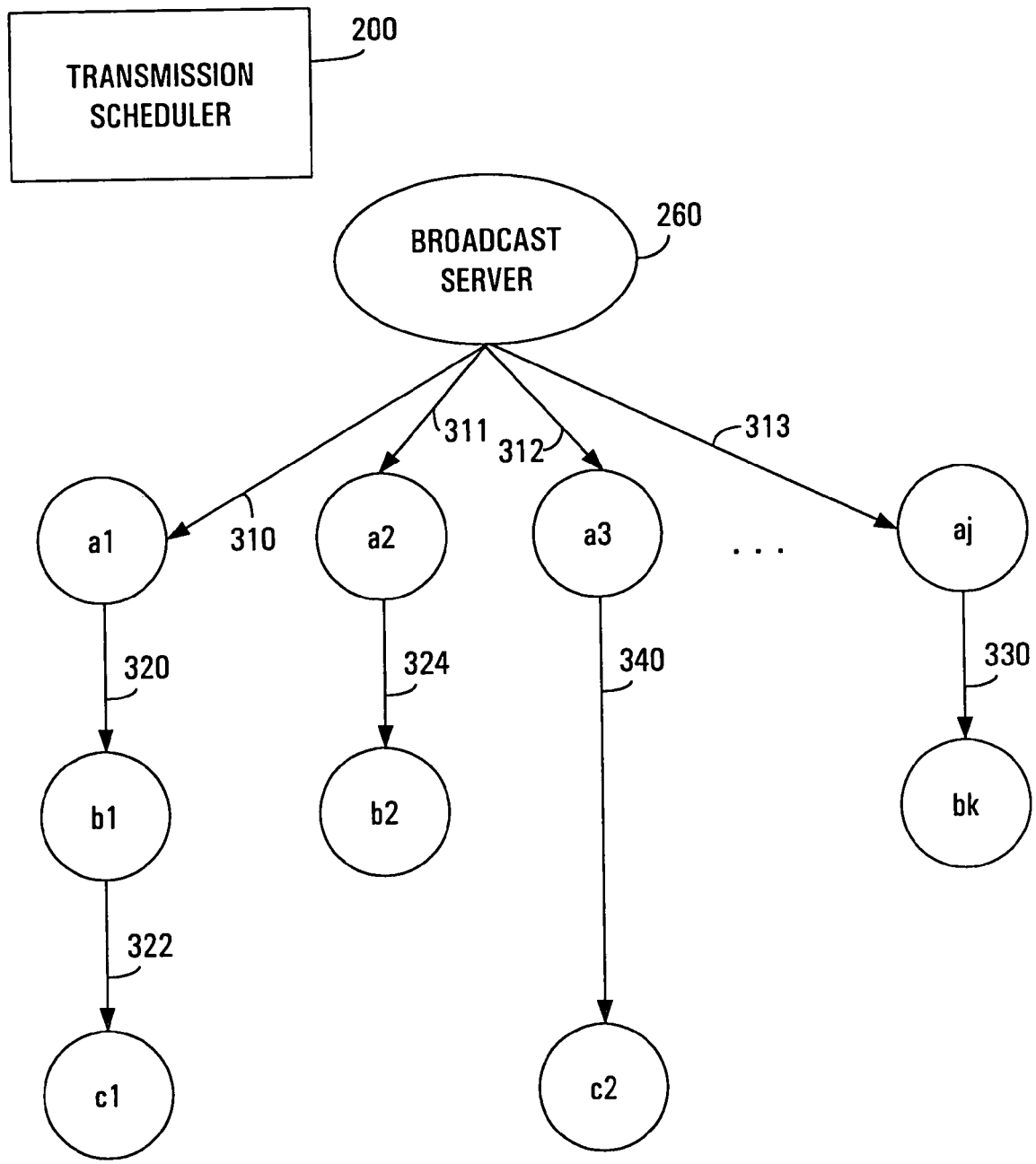
FIG. 3B is another exemplary communication diagram of the chaincast communication method of the present invention.

In the chaincast communication architecture, all users send status update messages to the transmission scheduler 200. Transmission scheduler 200 can use these status update messages to re-route communication links when the transmission activity of one user becomes too slow, or shuts down. For instance, assume user b3 of FIG. 3A shuts down. The result is shown in FIG. 3B where the transmission scheduler 200 created a new link 340 to directly connect user a3 to user c2.

The transmission scheduler 200 creates and maintains the new link 340 (as well as all other links). Assuming rendering pipelines are large enough within each user, the transfer or reassignment between communication sources from FIG. 3A to FIG. 3B (with respect to user c2) can be performed transparently to user c2.

As another example, assume user b3 of FIG. 3A decides to download a large software program from the Internet, consuming a substantial portion of his bandwidth. In this case, user c2 begins to receive broadcast data at a rate that is too slow based on a predetermined threshold. User c2 reports this in a periodic message to the transmission scheduler 200.

Figure 3C:
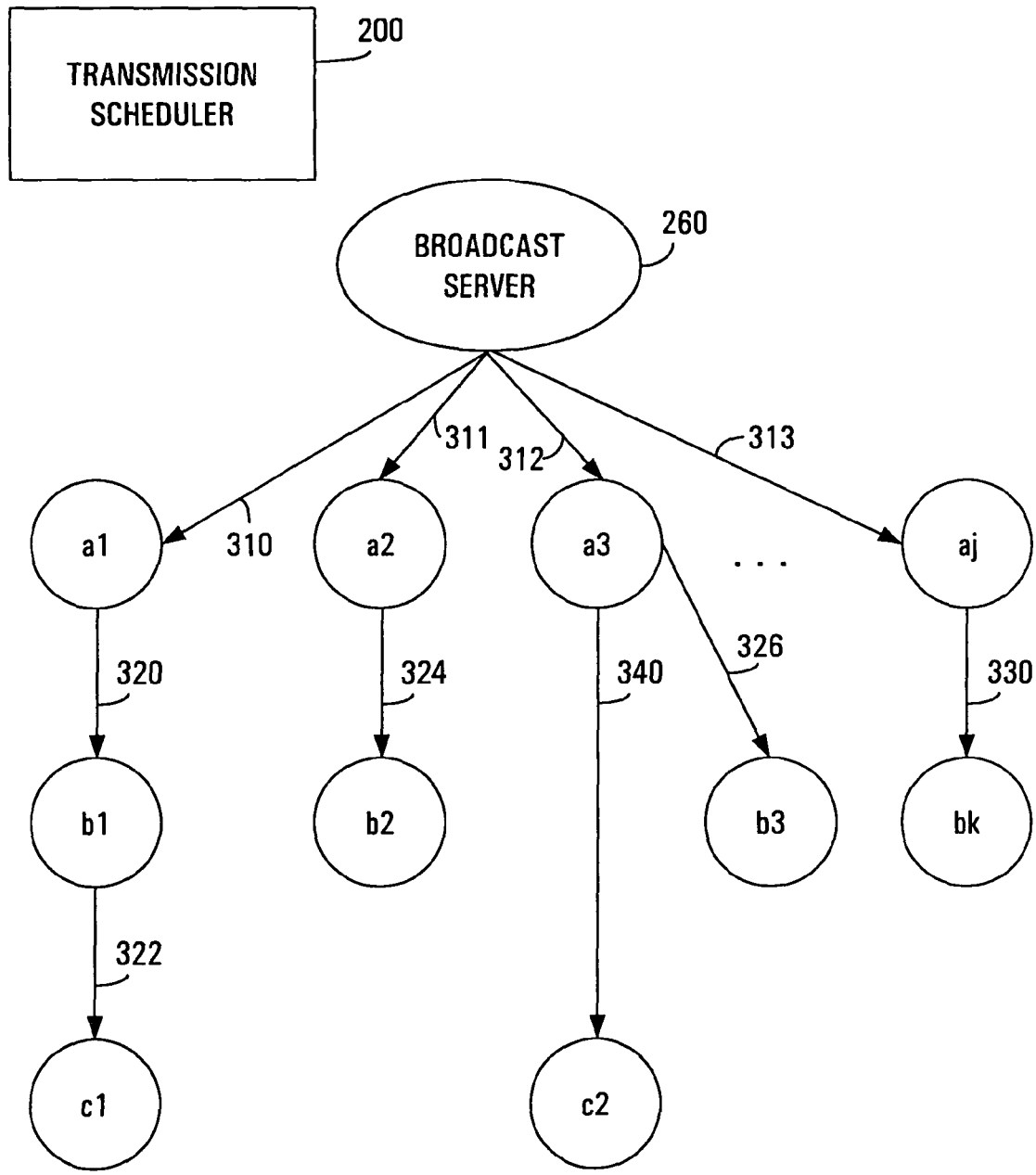
FIG. 3C is another exemplary communication diagram of the chaincast communication method of the present invention.

The transmission scheduler 200 then reassigns the source for user c2. The resulting re-transmission pathways are illustrated in FIG. 3C when the transmission scheduler 200 created a new link 340 to directly connect user a3 to user c2 while maintaining the link 326 between user a3 and user b3. The detailed mechanisms for detecting a slow or dead link between users in accordance with one embodiment of the present invention are described herein to follow.

Figure 4:
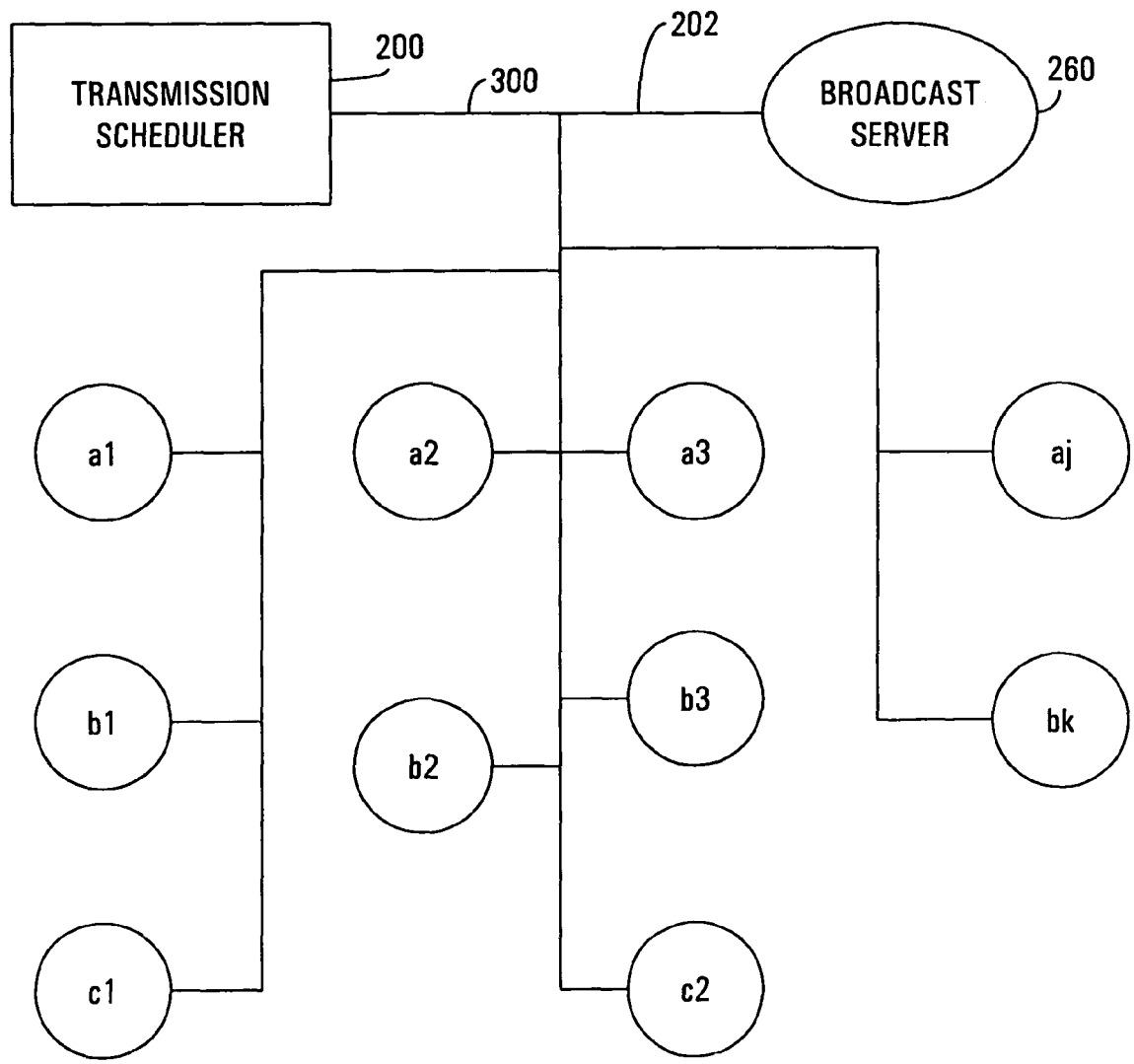
FIG. 4 is an Internet connection diagram of the devices of FIG. 3A.

FIG. 4 is a high level diagram of the Internet connection system of the devices of FIG. 3A. The users, a1-aj, b1-bk, c1 and c2 are coupled to the Internet 300. The broadcast server 260 and the transmission scheduler 200 are coupled to the Internet. Server 260 and scheduler 200 can reside in separate computer systems or can reside within the same computer system. Internet connection 202 is located between the broadcast server 200 and the Internet 300 and has a finite communication bandwidth that dictates the number of users a1-aj that can directly receive broadcast information packets, from the server 260.

Figure 5A:
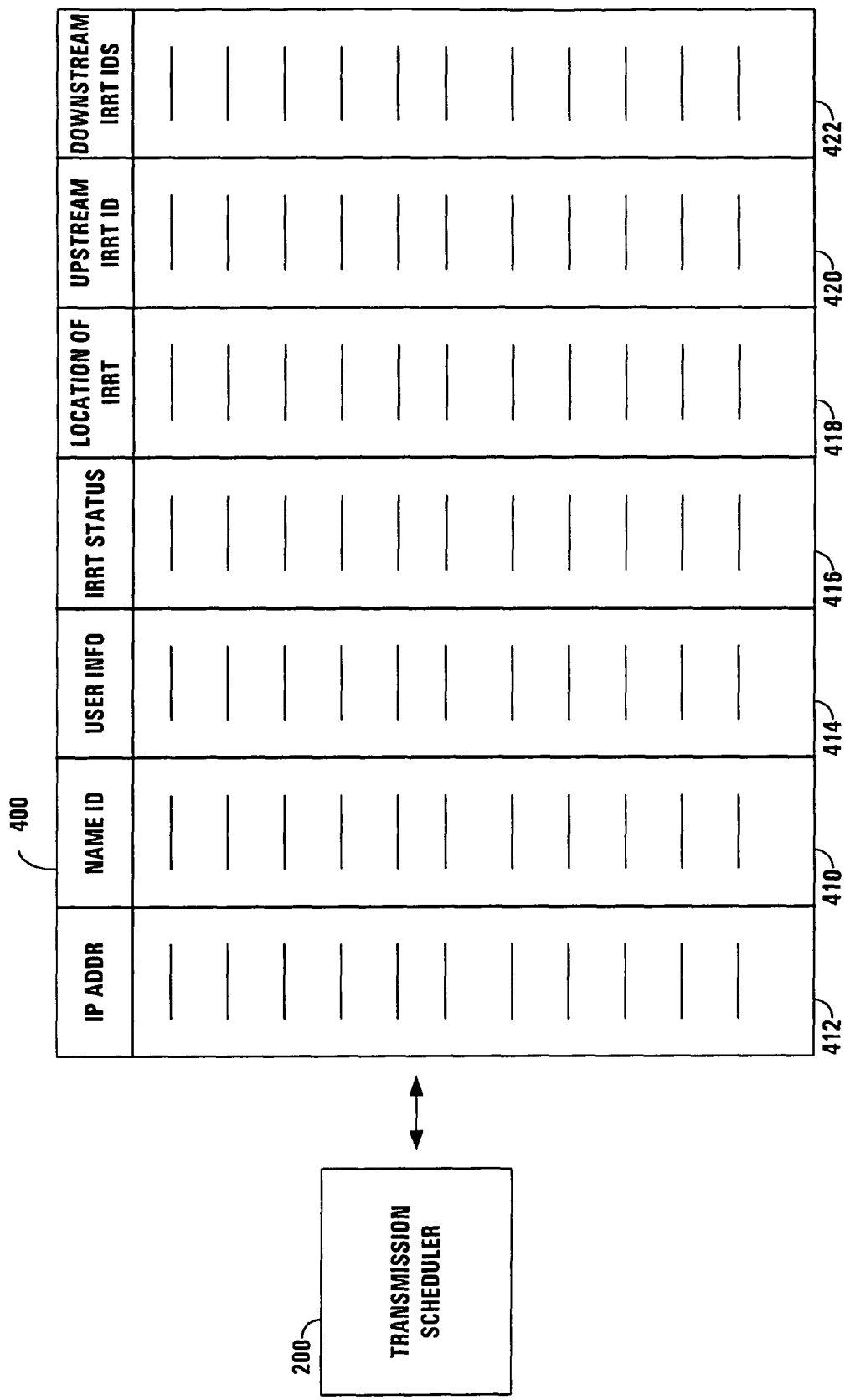
FIG. 5A illustrates a name table managed by the transmission scheduler for the user devices of the present invention.

FIG. 5A illustrates that the transmission scheduler 200 can be coupled with a name server 400 that contains a listing of IP addresses 412 for each user and each user has an associated unique name (column 410). This name server 400 can be used to establish communication links (e.g., to support Internet telephony) between users. If a first user wants to talk to a second user, the first user informs transmission scheduler 200 of the communication link between itself and name of the second user. The transmission scheduler 200 then opens a direct link between the first and second users, over the Internet 300. For example, links 320, 322, 324, 326, 328, 330 shown in FIG. 3A can be opened using the name server in this fashion, but the establishment of these links and the designation of users are controlled by the transmission scheduler 200.

Name server 400 also contains user information (e.g., name, address, phone number, etc.) of each user (column 414). In addition, name server 400 includes a listing of the status information (column 416) of the user devices associated with each of the users, a listing of the sources (column 420) from which the user devices receive broadcast content, and a listing of the targets (column 422) to which the user devices relay broadcast content. The status information (column 416) is used by the transmission scheduler 200 to determine the availability of a particular user device for relaying broadcast content. Name server 400 further includes geographical location information (column 418).

Figure 5B:
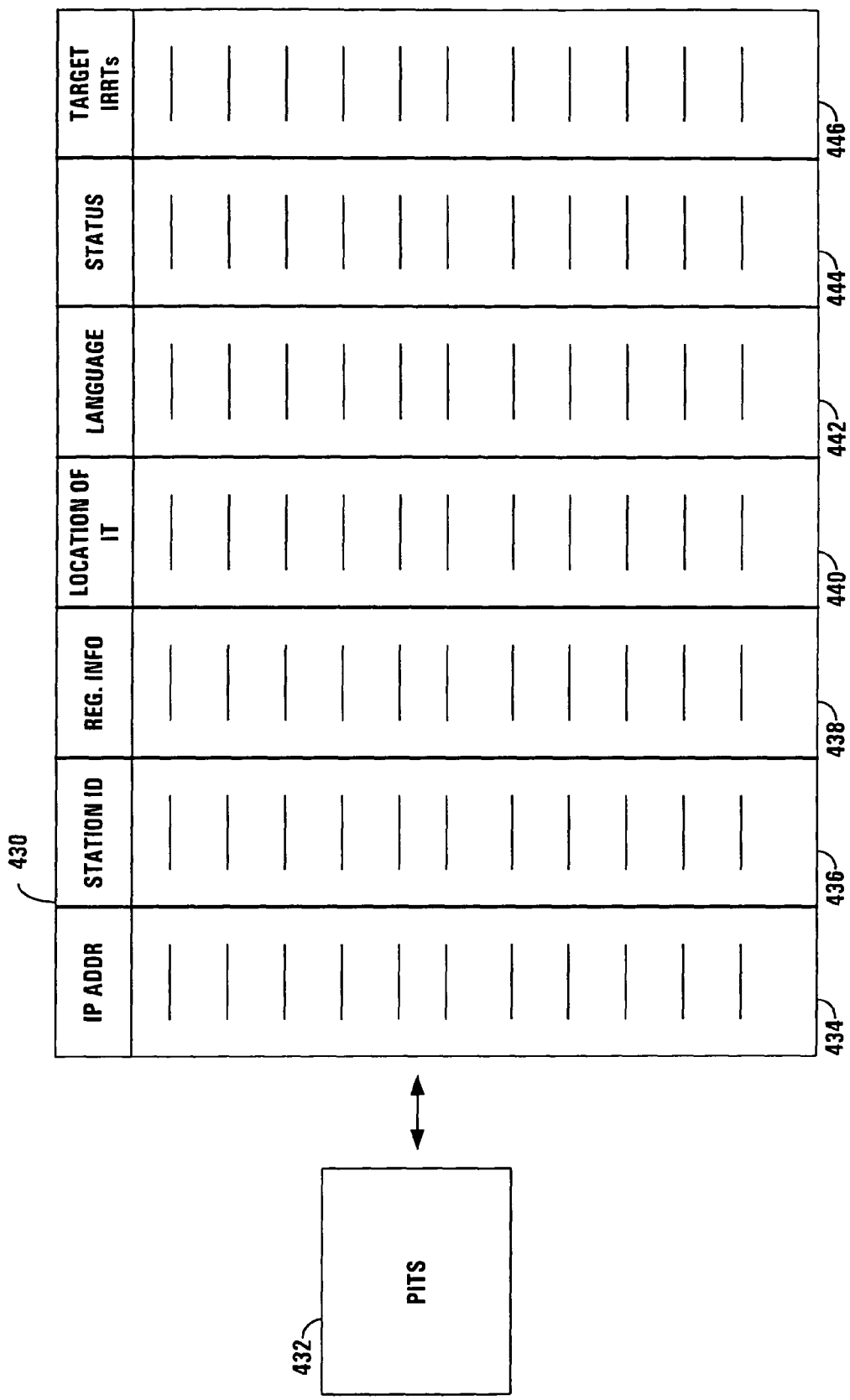
FIG. 5B illustrates a name table managed by the transmission scheduler for information transmitters of the present invention.

FIG. 5B illustrates that transmission scheduler 200 can be coupled with a name server 430 that contains a listing of IP addresses 434 for each information transmitter (e.g., broadcast server 260) and each information transmitter has an associated unique station name (column 436). The station name may be the name of the radio station or TV station that the information transmitter carries. This name server 430 is used to establish communication links (e.g., to support Internet telephony) between information transmitters and the users. If a user wants to receive broadcast information from an information transmitter, the user informs transmission scheduler 200 of the name of the information transmitter or a station name. The transmission scheduler 200 then opens a direct link between the information transmitter and the user over the Internet 300. For example, links 310, 311, 312, 313 shown in FIG. 3A, FIG. 3B and FIG. 3C can be opened using the name server in this fashion, but the establishment of these links and the designation of users are controlled by the transmission scheduler 200.

Name server 430 also contains registration information (e.g., maximum number of user devices permitted, etc.) of each information transmitter (column 438). In addition, name server 430 includes a listing of the targets (column 446) to which the information transmitters transmit broadcast content. A listing of the geographical location of the information transmitters (column 440), a listing of the language in which the broadcast is made (column 442) and a listing of the status of the information receivers (column 444) are also included in name server 430. It should be appreciated that the transmission scheduler 432 and the name server 430 of the present embodiment may be implemented within a primary broadcast server for chaincasting primary content and within a secondary broadcast server for chaincasting second content. Primary and secondary broadcast servers will be discussed in greater details further below.

Scheduling Operations and Method for Maintaining Continuous Data Flow within a Chaincast Communication System An example is given to illustrate the scheduling operations and the method for maintaining continuous data flow within a chaincast communication system of the present invention. In the following example, the chaincast communication system of the present invention includes one or more broadcast servers, a chaincast server and a number of information receivers and re-transmitters (IRRTs). On a broadcast server (e.g., broadcast server 260) is placed software that is operating as a multi-channel information transmitter. Individual broadcast servers may be operated by content providers (e.g., radio stations, television stations, or other multi-media content providers) for providing information on the Internet. On the chaincast server (or another broadcast server) is placed software that is operating as: 1) a chaincast manager (CCM); 2) a name server; and 3) transmission scheduler (e.g., transmission scheduler 200). The CCM functions to coordinate and supervise the operations of the name server and the transmission scheduler. In the present embodiment, each IRRT includes a computer system (analogous to computer system 112) and has an information rendering process, e.g., a radio software program ("Internet radio"), operating that allows broadcast digital packets to be decoded to thereby render a perceptible image and/or an audible sound, e.g., a radio program, originated by the multi-channel information transmitter.

Figure 6:
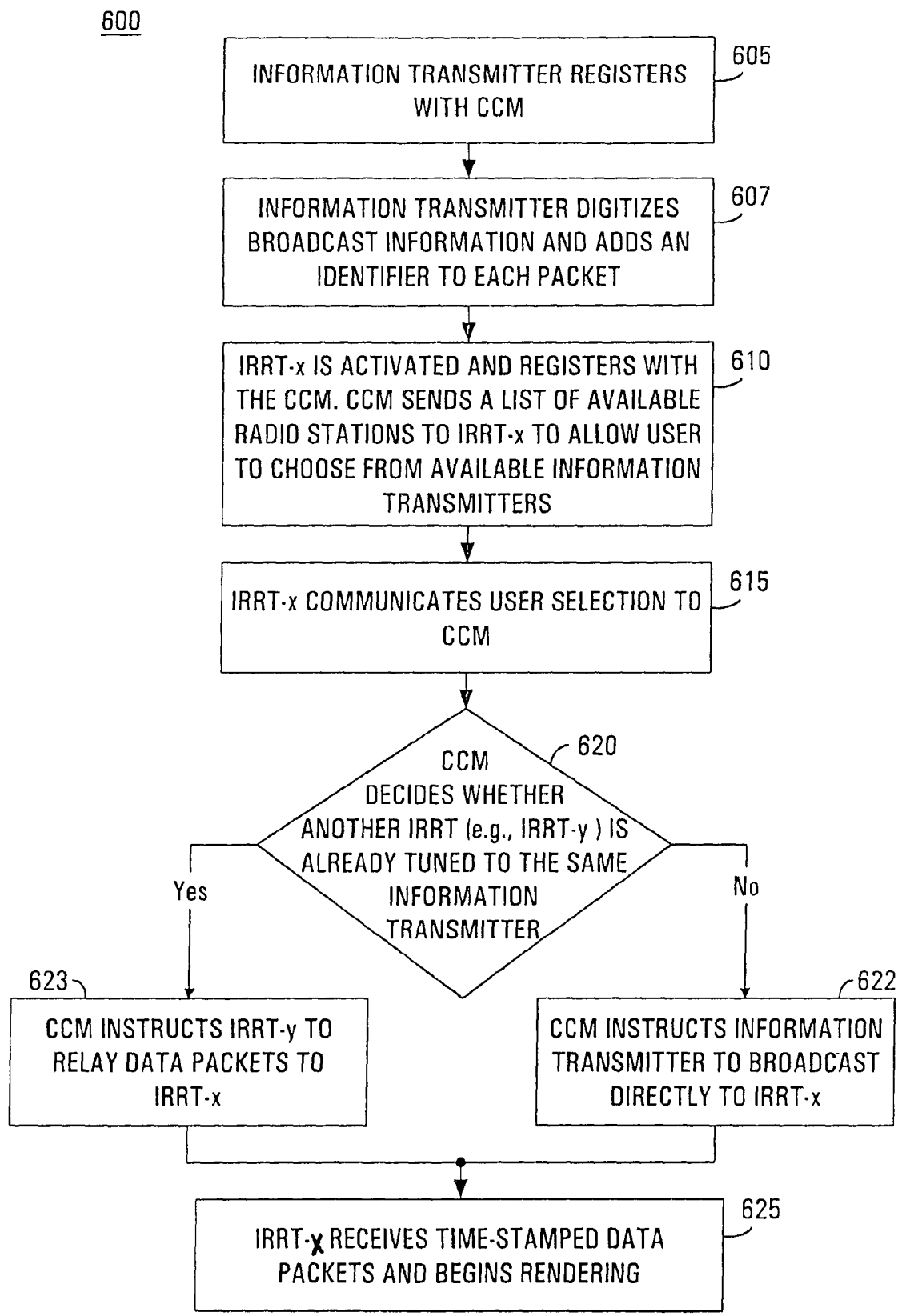
FIG. 6 is a flow chart diagram illustrating steps of the chaincast communication method of the present invention.

FIG. 6 is a flow chart diagram illustrating the scheduling operations of the chaincast communication system according to an embodiment of the present invention. As illustrated, at step 605, when an information transmitter is activated, it will register itself with the chaincast manager (CCM), and will inform the CCM the identity of the broadcast information source (e.g., a radio station). According to one embodiment of the present invention, an information transmitter is responsible for chaincasting information from only one broadcast information source. However, in the present embodiment, a broadcast server may include multiple information transmitters. Therefore, a broadcast server may be used to chaincast information originated from multiple information sources.

At step 607, the information transmitter digitizes broadcast information from the information source into data packets and adds an identifier to each of the data packets. The identifier, according to the present embodiment, is a time stamp indicating the time a data packet is created. The broadcast information, however, is not immediately forwarded or re-transmitted to an IRRT. Rather, the broadcast information is temporarily stored within a transmission buffer of the broadcast server. In the present embodiment, broadcast information is continuously received by the information transmitter. Thus, old data packets stored within the transmission buffer are continuously discarded to make room for new data packets. Further, the transmission buffer includes a buffer forward (TBF) portion for storing data packets that are not yet transmitted, and a buffer past (TBP) portion for storing data packets that have already been transmitted.

Referring again to FIG. 6, at step 610, when a user (e.g., user A) wants to receive chaincast information, he/she will turn on or activate an information receiver and re-transmitter (e.g., IRRT-x) which will connect to the CCM and will inform the CCM about its IP address. IRRT-x will then receive from the CCM a list of available information transmitters that are registered with the CCM. Within the present embodiment, IRRT-x presents the list to user A such that user A can select the broadcast information that he/she wants to receive. The list may include alphanumeric representations of names of the radio stations, TV stations, etc., carried by the information transmitters that are available to the user. The list may also include alphanumeric representations of languages of the radio stations that are available.

At step 615 of FIG. 6, user A then selects an information transmitter and IRRT-x will send this information to the CCM. The IRRT-x is now "tuned" to the selected information transmitter.

At step 620, after the CCM receives the information regarding the selected information transmitter from IRRT-x, the CCM then decides whether IRRT-x will receive time-stamped data packets directly from the selected information transmitter, or whether IRRT-x will receive time-stamped data packets from another IRRT which is already tuned to the selected information transmitter.

At step 622, if it is determined that no other IRRTs are suitable for relaying the time-stamped data packets, CCM will instruct the selected information transmitter to begin transmitting time-stamped data packets to this IP address (the IP address of IRRT-x).

At step 623, if an IRRT (IRRT-y) that is already tuned to the same information transmitter is available and has sufficient bandwidth, the CCM will instruct IRRT-y to relay the time-stamped data packets to IRRT-x according to the chaincast approach as discussed above (FIG. 3A, FIG. 3B and FIG. 3C).

At step 625, IRRT-x receives time-stamped data packets from the information transmitter and begins to render the time-stamped data packets. At the same time, IRRT-x will store data packets to be rendered in its transmission buffer. According to one embodiment, data packets that have been rendered will not be immediately discarded. Rather, rendered packets will be temporarily stored in the transmission buffer for subsequent re-transmission to another IRRT.

At step 625, as the information stored in the transmission buffer of IRRT-x is rendered and as the transmission buffer is draining, IRRT-x generates requests to its chaincast source (e.g., the information transmitter or another IRRT) to download more data. Particularly, in the present embodiment, IRRT-x is configured to generate a request as the transmission buffer is draining past a "Buffer Low" level. The requests generated by IRRT-x may also include a time stamp of the last data packet received by IRRT-x such that its source may begin transmission with the next data packet.

In this manner, a user of the chaincast communication system of the present invention will receive the data either directly from the server, over the Internet, or from another user that is already receiving the information (in the chaincast mode). The new user can then later be asked to provide, e.g., forward broadcast information to another user.

According to one embodiment of the present invention, the transmission buffer of IRRT-x includes a forward buffer (TBF) for storing data packets to be rendered and a past buffer (TBP) for storing data packets that have already been rendered. Further, TBF and TBP are both capable of storing data packets for at least 60 seconds of broadcast information the packet transmission speed is higher than the rendering speed. Therefore, if the connection remains stable, the TBF buffer will be close to full all the time. Thus, in the event that the connection between the information transmitter and IRRT-x becomes unstable, the users will not experience "gaps" in the broadcast information. Problems associated with fluctuations in packet rate are also avoided. The TBP, on the other hand, stores data packets that have already been rendered but may be required for subsequent transmission to a downstream IRRT.

Figure 10:
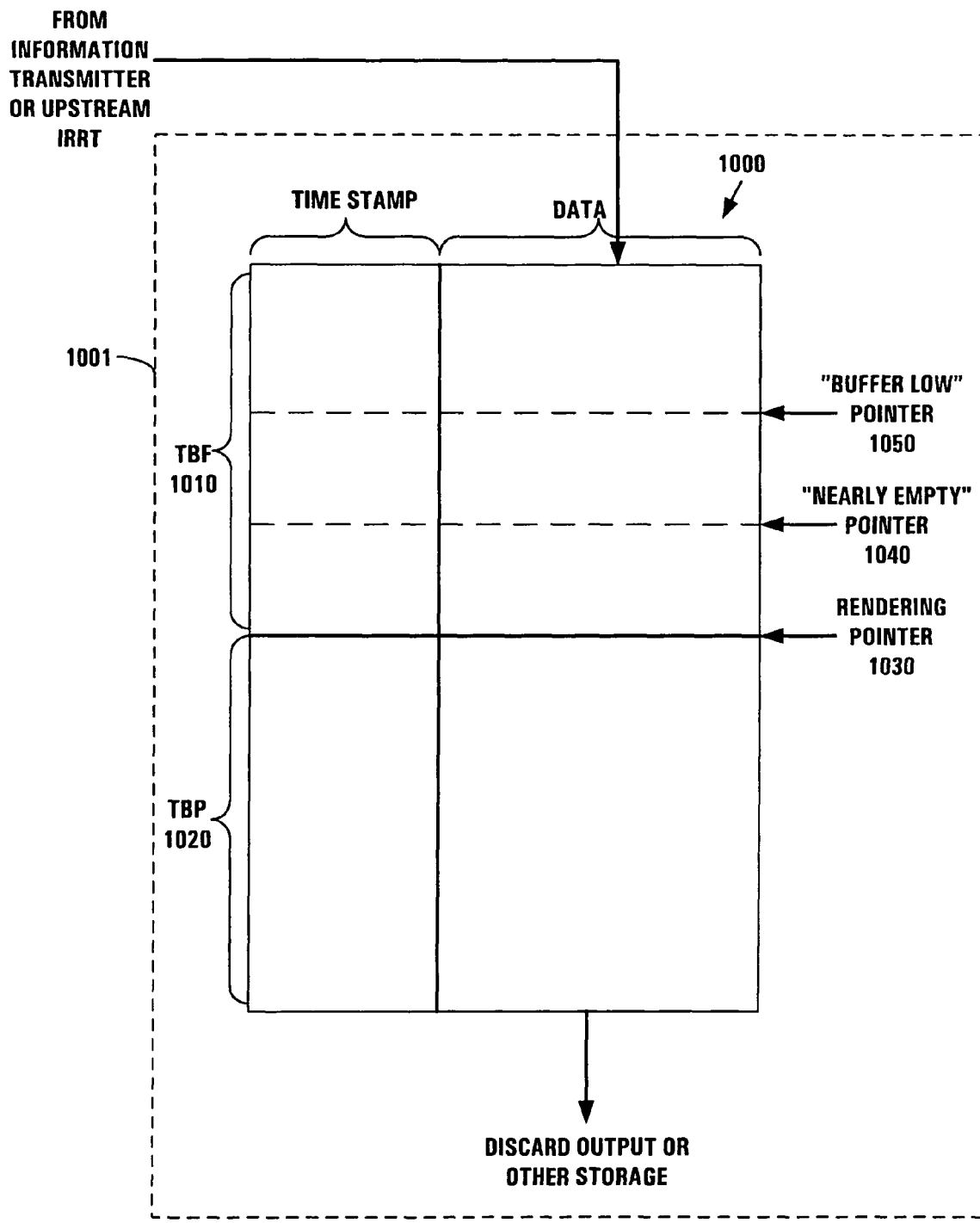
FIG. 10 is a logical block diagram illustrating a transmission buffer according to one embodiment of the present invention.

An exemplary transmission buffer 1000 of an IRRT 1001 is illustrated in FIG. 10. As illustrated, transmission buffer 1000 is partitioned by a rendering pointer 1030 into two portions: a buffer forward (TBF) 1010 for storing the information to be rendered and buffer past (TBP) 1020 for storing the information that has already been rendered. Rendering pointer 1030 is pointing to the specific data packet(s) that is currently rendered. The transmission buffer 1000 is configured for receiving and storing time-stamped data packets from a chaincast source (e.g., information transmitter or an upstream IRRT). It is important to note that the time stamps are also received from the chaincast source. Also illustrated in FIG. 10 is a "near empty" pointer 1040 and a "buffer low" pointer 1050. According to the present invention, if the number of data packets falls below the "buffer low" pointer 1050, IRRT 1001 will signal its chaincast source to send more data packets. If the number of data packets falls below the "near empty" pointer 1040, IRRT 1001 will signal the CCM to assign another chaincast source for the IRRT 1001. In this way, the transmission buffer 1000 will be maintained at full level such that problems with fluctuations in data packet rate are minimized. As data packets are rendered, they are pushed into the TBP 1020 for subsequent re-transmission to another IRRT, while data packets pushed out from the bottom of TBP 1020 are either discarded or moved to a storage device.

In order to maintain continuous data flow along the communication "chains," it is important to monitor the packet rates between the IRRTs. In response to the buffer content level falling below a pre-determined threshold value, the present invention re-routes communications between the user devices to provide better communication load sharing across the system. According to the present invention, the transmission buffers of the IRRTs are used to monitor the packet rates. Particularly, each IRRT monitors a number of unrendered data packets stored within its own transmission buffers. When the number of unrendered data packets falls below a threshold level, the IRRT signals its near-empty condition to the CCM such that a different upstream IRRT can be assigned to it.

Figure 7:
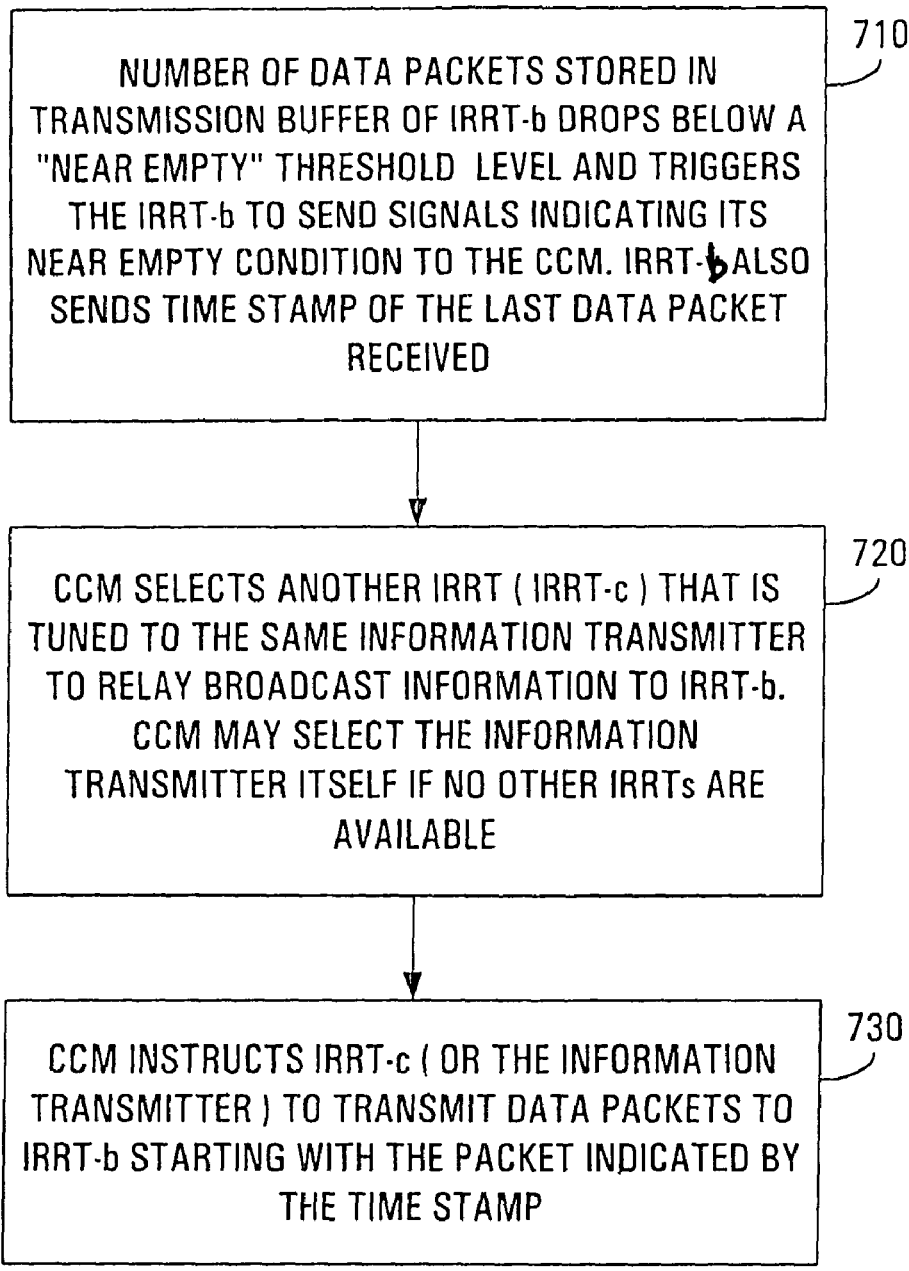
FIG. 7 is a flow chart diagram illustrating steps of the chaincast communication method of the present invention.

FIG. 7 is a flow chart diagram illustrating steps of re-routing communications within the chaincast communication system of the present invention. In the present example, for the purpose of illustration, it is assumed that the connection between an IRRT-b and its upstream IRRT-a becomes very slow. This may be caused by the IRRT-a shutting down or other reasons. Thus, at step 710, the lowered packet rate causes the number of unrendered data packets stored within the transmission buffers of the IRRT-b to drop below a predetermined threshold (e.g., "Nearly Empty" threshold 1040), and triggers it to send a signal indicating the buffer's near empty condition to the CCM. In addition, at step 710, IRRT-b sends to the CCM the time-stamp of the last data packet that it received.

Then, at step 720, the CCM selects another information receiver and re-transmitter (IRRT-c) which is tuned to the same information transmitter to relay the broadcast information to IRRT-b. If no other IRRTs are available, then the CCM selects the information transmitter to broadcast directly to IRRT-b.

At step 730, after IRRT-c (or the information transmitter) is selected, it is instructed by the CCM to forward the data packets to IRRT-b starting with the packet indicated by the time stamp. Sometimes, IRRT-c may no longer have the desired data packets. In that case, IRRT-c will begin transmitting the last data packet contained in its TBP, and some broadcast information will be lost. However, a small amount data loss is acceptable for broadcast content such as a radio program. In other cases where direct transmission is not feasible and where no other IRRTs are tuned to the same information transmitter, the CCM may use an IRRT that is in a "stand by" mode or that is tuned to a different station to relay the broadcast information.

Primary and Secondary Information Transmitters

Figure 8A:
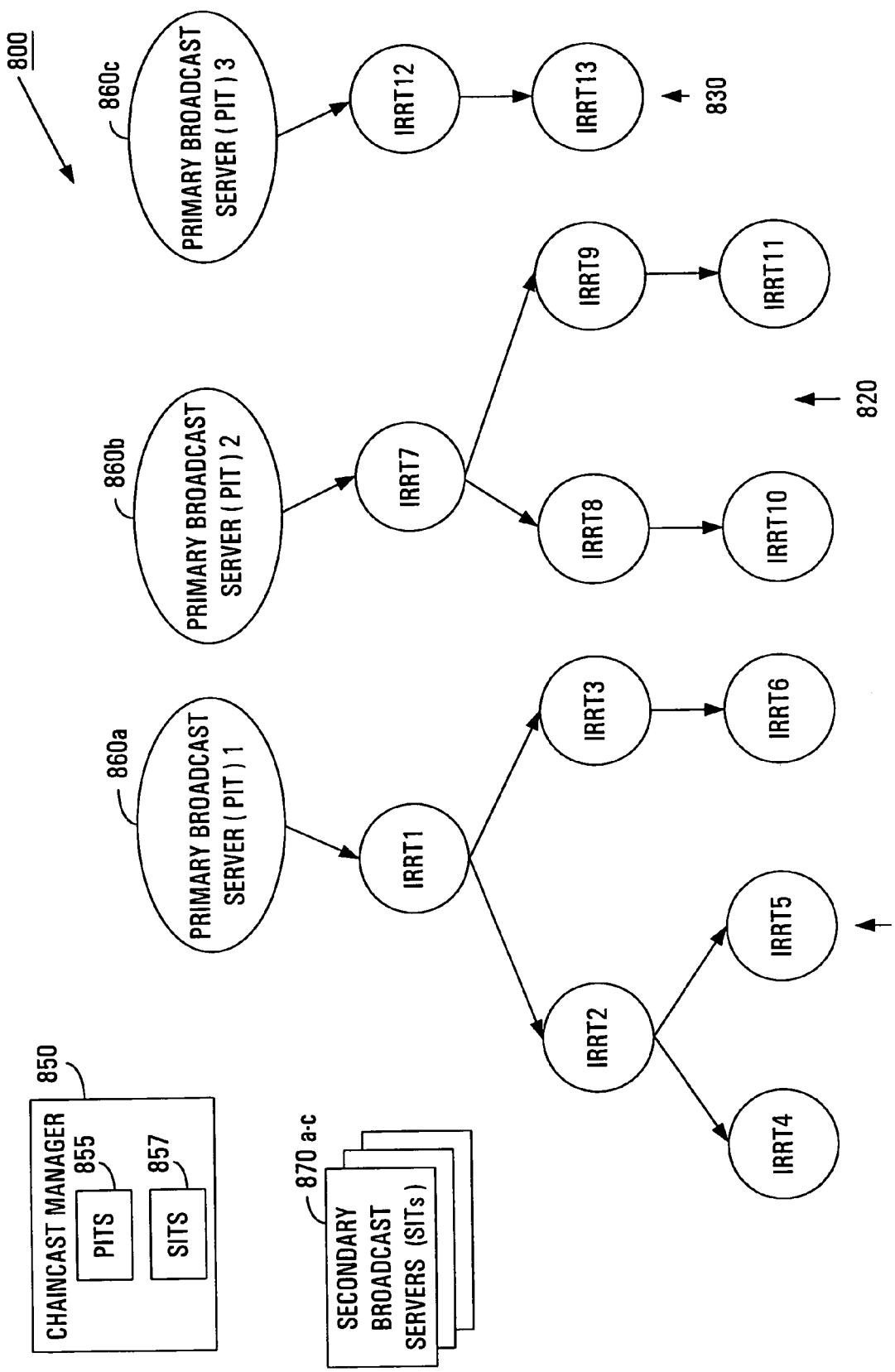
FIG. 8A is an exemplary communication diagram of the chaincast communication method according to one embodiment of the present invention.

FIG. 8A is another exemplary chaincast communication system 800 according to an embodiment of the present invention. Within FIG. 8, a primary broadcast server 860a supplies broadcast content to a communication chain 810 consisting of information receiver and re-transmitters IRRT1-IRRT6. Another primary broadcast server 860b chaincasts broadcast content to another communication chain 820 consisting of information receiver and re-transmitters IRRT7-IRRT11. Yet another primary broadcast server 860c chaincasts broadcast content to communication chain 830 consisting of information receiver and re-transmitters IRRT12 and IRRT13. Primary broadcast servers 860a-860c are also called primary information transmitters (PITs). Secondary broadcast servers 870a-870c supply supplemental content to the information receiver and re-transmitters IRRT1-IRRT13. In the present embodiment, information receiver and re-transmitters IRRT1-IRRT13 each consists of a computer system running software that is configured for receiving and re-transmitting primary and secondary content to another user device as instructed by a primary information transmission scheduler (PITS) 855 and a secondary information transmission scheduler (SITS) 857 of chaincast manager (CCM) 850.

Significantly, according to the present invention, the primary broadcast servers 860a-860c are configured for chaincasting primary content that is originated from a radio broadcaster, a TV broadcaster or other multi-media content provider, and the secondary broadcast servers 870a-870c are for chaincasting secondary or supplementary content that may not be originated from radio broadcasters, TV broadcasters or multi-media content providers. Secondary broadcast servers 870a-870c are also called secondary information transmitters (SITs). Typically, the primary broadcast servers 860a-860c can be operated by the information source companies (e.g., radio stations, TV networks) and the secondary broadcast servers 870a-870c (e.g., responsible for transmitting advertising content) can be operated by Internet service providers or ChainCast, Inc. of California, under the control of the secondary information transmission scheduler (SITS) 857 of CCM 850. In the present embodiment, the SITS coordinates the chaincasting of the secondary information in a similar manner that the primary broadcast information is chaincasted.

As an example, the primary content may be a radio program broadcast by BBC of Great Britain. The secondary content, on the other hand, may be weather information of the location of the user. As another example, the secondary content may be real-time stock quotes. According to one embodiment of the present invention, the secondary information may be rendered in the background while the primary content (e.g., radio program from BBC) is rendered at a louder volume in the foreground. The secondary content may also be inserted in between the primary content. The secondary broadcast servers 870a-870c may also provide emergency broadcast information such as earthquake and flood warnings. It should be appreciated that only a few exemplary uses of the secondary broadcast servers 870a-870c are described herein and that the secondary broadcast servers 870a-870c may be used to supply all kinds of information to the information receiver and re-transmitters IRRT1-IRRT13. It should be noted that the secondary information may be audio or visual or any other types of multi-media information.

According to one embodiment of the present invention, the CCM 850 is responsible for providing a list of secondary content categories to the users. The users will then be able to select a particular category of secondary content that they would like to receive. The secondary information transmitter scheduler (SITS) 857, based on the user-inputs, will then select the appropriate secondary information transmitters (SITs) to provide secondary content pertinent to the selected category to the users. As an example, if a user selects a secondary content category for "automobiles," the SITs will choose an SIT carrying automobile-related advertisement to chaincast the advertisement to the user. It should be noted that the secondary content in this case ("automobiles") can be completely independent of the primary content that the user is receiving. In this way, locally relevant information may be provided to a user even though the user is tuned to a remote information broadcaster.

Figure 8B:
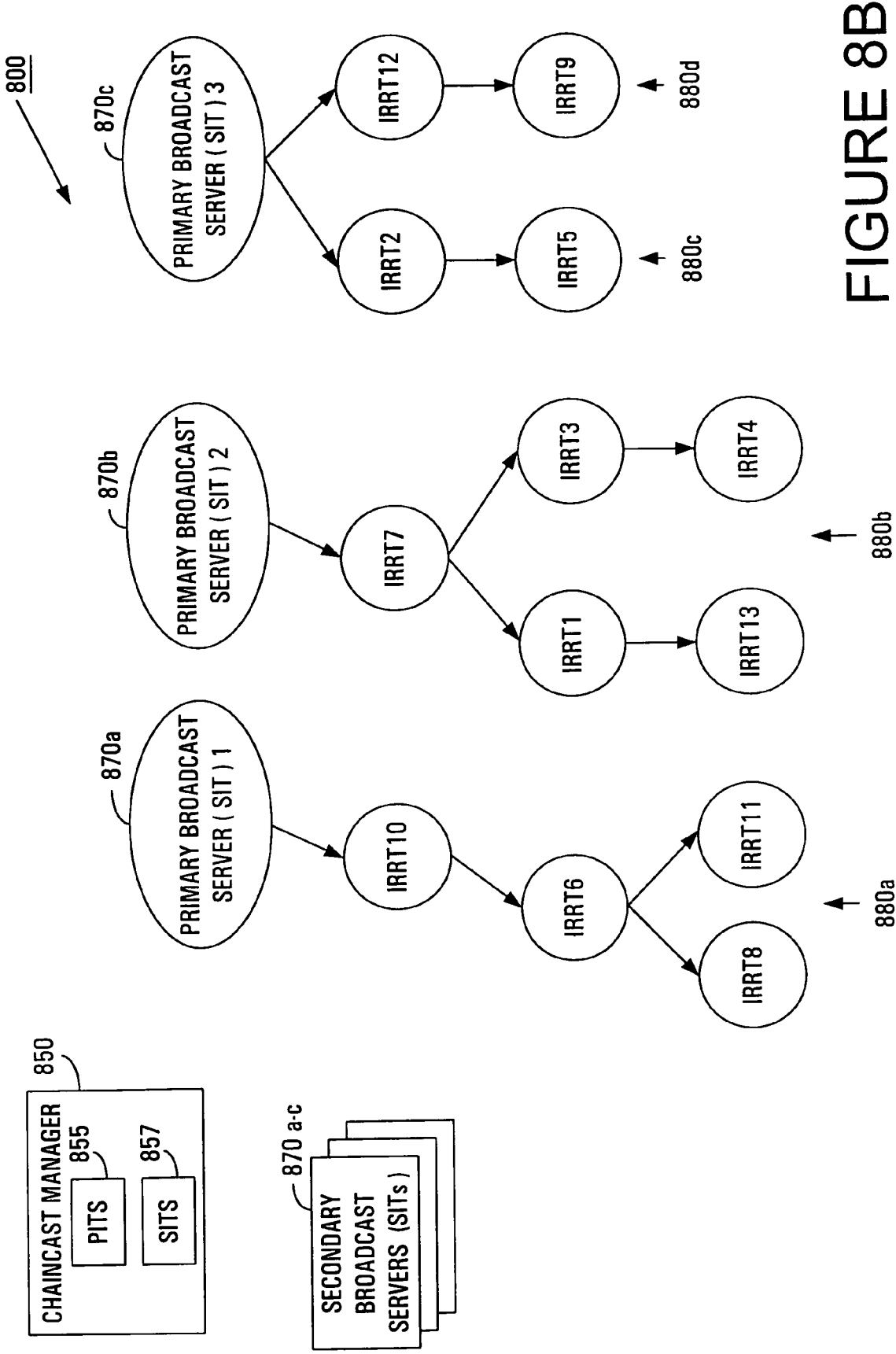
FIG. 8B is another exemplary communication diagram of the chaincast communication method according to one embodiment of the present invention.

It should also be noted that secondary information does not have to be transmitted along the same communication chains defined by the primary information transmitter scheduler. In order words, the SITS does not have to use the same communication chains defined by the PITS to relay secondary information. Indeed, the communication topology for the secondary information can be significantly different from the communication topology for the primary information. FIG. 8B illustrates a configuration of the communication chains 880a-880d of the chaincast communication system 800 of FIG. 8. As illustrated, secondary information are transmitted along communication chains 880a-880d to IRRT1-IRRT13. However, the composition of communication chains 880a-880d is entirely different form the composition of the communication chains 810, 820 and 830 of FIG. 8.

Figure 13:
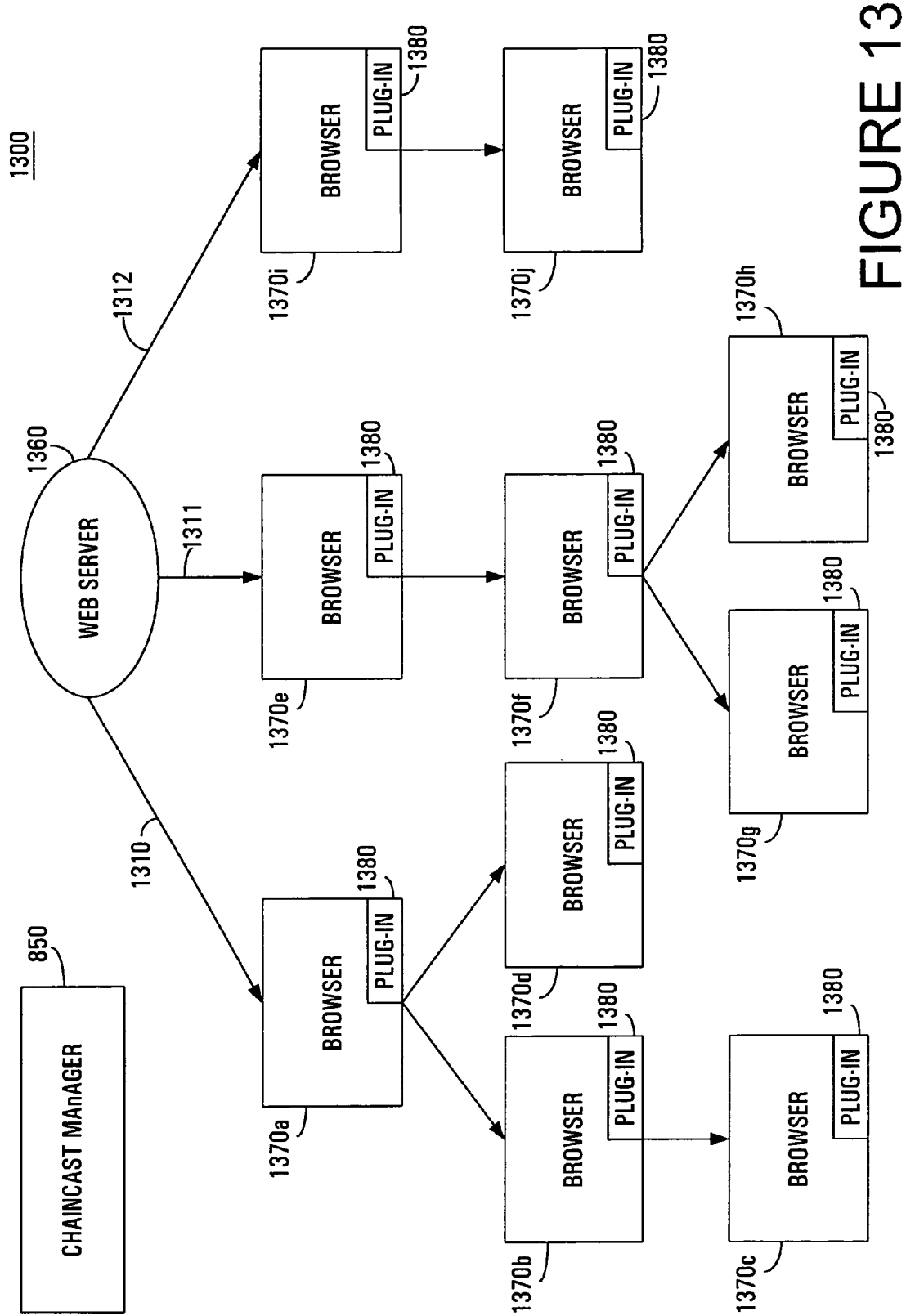
FIG. 13 is an exemplary configuration a chaincast communication system according to yet another embodiment of the present invention.

Method and System for Chaincasting Web-Content in Accordance with the Present Invention The chaincast paradigm in accordance with the present invention is not only applicable to radio broadcast and TV broadcast, but is applicable to Web-content, such as HTML-based Web-content, as well. FIG. 13 illustrates a chaincast communication system 1300 for performing the chaincast communication method according to an embodiment of the present invention. Within FIG. 13, a Web server 1360 supplies Web content to a communication chains 1310, 1320 and 1330. Communication chain 1310 includes Web clients 1370a-1370d, communication chain 1320 includes Web clients 1370e-1370h, and communication chain 1330 includes Web clients 1370i-1370j. According to the present embodiment each of the Web clients 1370a-1370j is a computer system (e.g., computer system 112) operating a Web browser software. Further, in the present embodiment, the browser software includes a software module ("chaincast plug-in") 1380.

In the present embodiment, the "chaincast plug-in" module 1380 is configured for relaying Web-content from one Web-client to another as instructed by a chaincast manager (CCM) 850. In the example illustrated in FIG. 13, Web-client 1370a receives Web-content directly from the Web server 1360 via information stream 1310. Web client 1370a includes chaincast plug-in 1380 configured for retransmitting Web-content that it received from Web server 1360 to Web-clients 1370b and 1370d under the instructions from CCM 850. Web-clients 1370b and 1370d, in turn, relay the web-content information it received to other Web-clients including web-client 1370c. Web-content is also disseminated in a similar fashion along communication chains 1320 and 1330.

Figure 14:
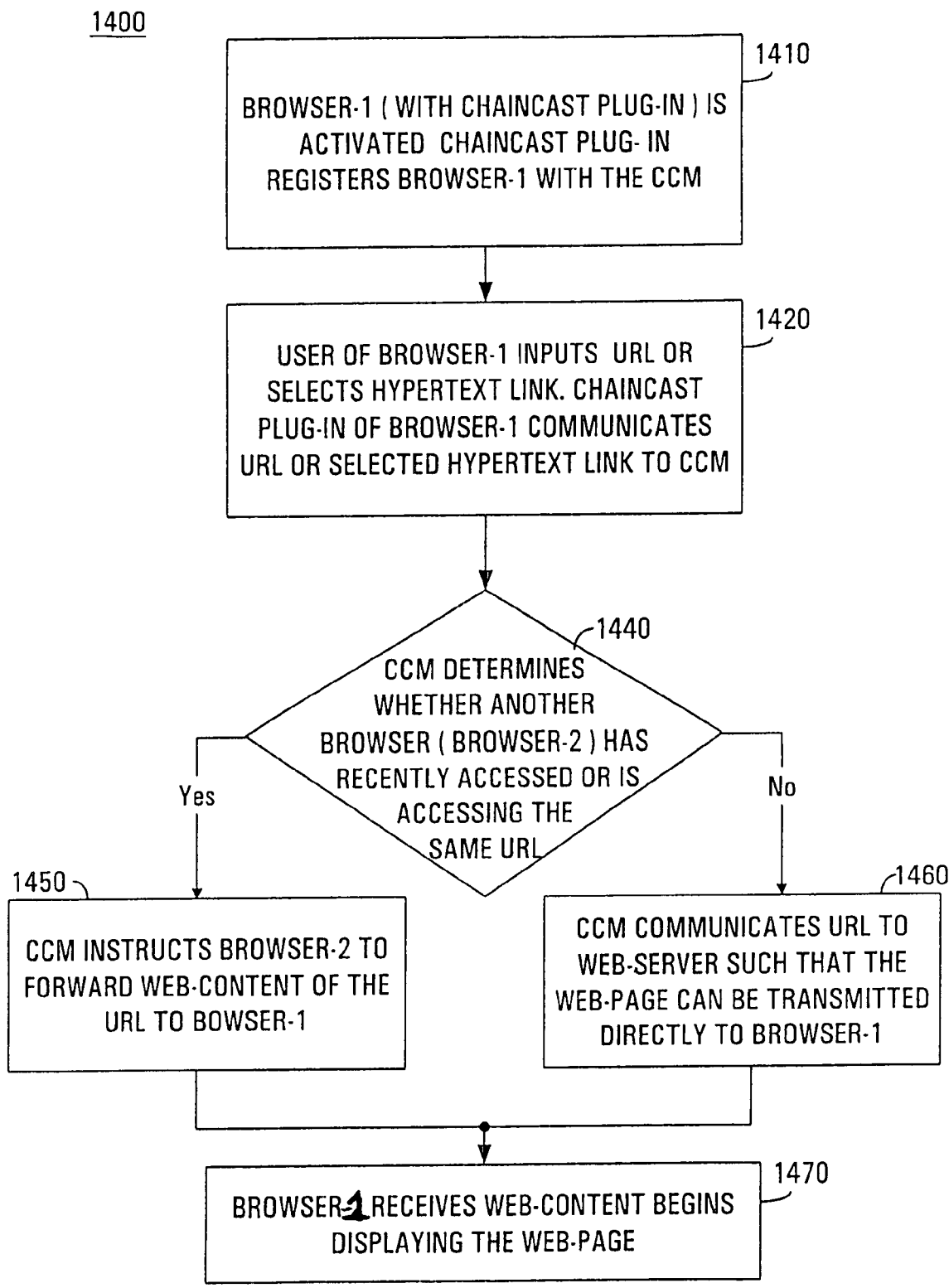
FIG. 14 is a flow chart diagram illustration operations of the chaincast communication system illustrated in FIG. 13 in furtherance of one embodiment of the present invention.

FIG. 14 is a flow diagram illustrating exemplary operations of the chaincast communication system 1300 in accordance with one embodiment of the present invention. As illustrated, at step 1410, when a Web-client (Web-client X) is activated, its chaincast plug-in module 1380 registers the Web-client with the CCM 850. According to the present invention, step 1410 may include the steps of modifying a name server (e.g., name server 400) by adding an IP address and a name ID corresponding to the Web-client X.

At step 1420, user of the Web-client X attempts to access a Web-page indicated by an URL. The chaincast plug-in module of Web-client X then automatically sends the URL to the CCM 850.

At step 1440, upon receiving the URL, the CCM 850 determines whether the Web-page indicated by the URL has been recently accessed by or is currently being accessed by another Web-client. CCM 850 may also determine the content of the cache memories of the Web-clients which have recently accessed the same URL.

At step 1450, if it is determined that another Web-client (Web-client Y) has recently accessed the same URL and possesses all the content of the URL in its cache memory, or if it is determined that Web-client Y is currently accessing the same URL, the CCM 850 will direct the Web-client Y to relay the content of the web-page to the Web-client X. In another embodiment of the present invention, the source client (Web-client Y) does not have to possess all the content of the URL in its cache memory. In that embodiment, CCM 850 will instruct Web-client Y to selectively forward information stored in its cache memory that is related to the URL to Web-client X.

However, at step 1460, if it is determined that no other Web-clients are accessing the same web-page, the CCM 850 will then communicate the URL the Web-server corresponding to the URL, and the requested web-page will then be transmitted directly to Web-client X. In this manner, a Web server would able to provide "pseudo" simultaneous access to a virtually unlimited number of people despite a limited connection bandwidth with the Internet.

Graphical User Interface of an Internet Radio with Chaincasting Capability According to the Present Invention According to one embodiment of the present invention, an IRRT can be implemented as a stand alone electronic radio device which is coupled to the Internet or the IRRT can be implemented as a software package operable on a host computer system which is coupled to the Internet. In either case, the Internet radio device does not require a browser for interfacing with other Internet transmitters ("Internet radio station transmitters"). The Internet radio includes a graphical user interface (GUI) with which a user can interface in order to receive audio radio programming from an Internet radio station transmitter. The radio device receives a list of Internet radio station transmitters that are registered with a chaincast manager (CCM), also coupled to the Internet. The GUI renders this list to the user. The user can sort or select from this list based on desired language, country, or station names. To hear a radio program, a user can select a station from this list. Data received by a radio device can be retransmitted in chaincast mode from the radio device to other radio devices that want to listen to the same radio program.

Figure 9:
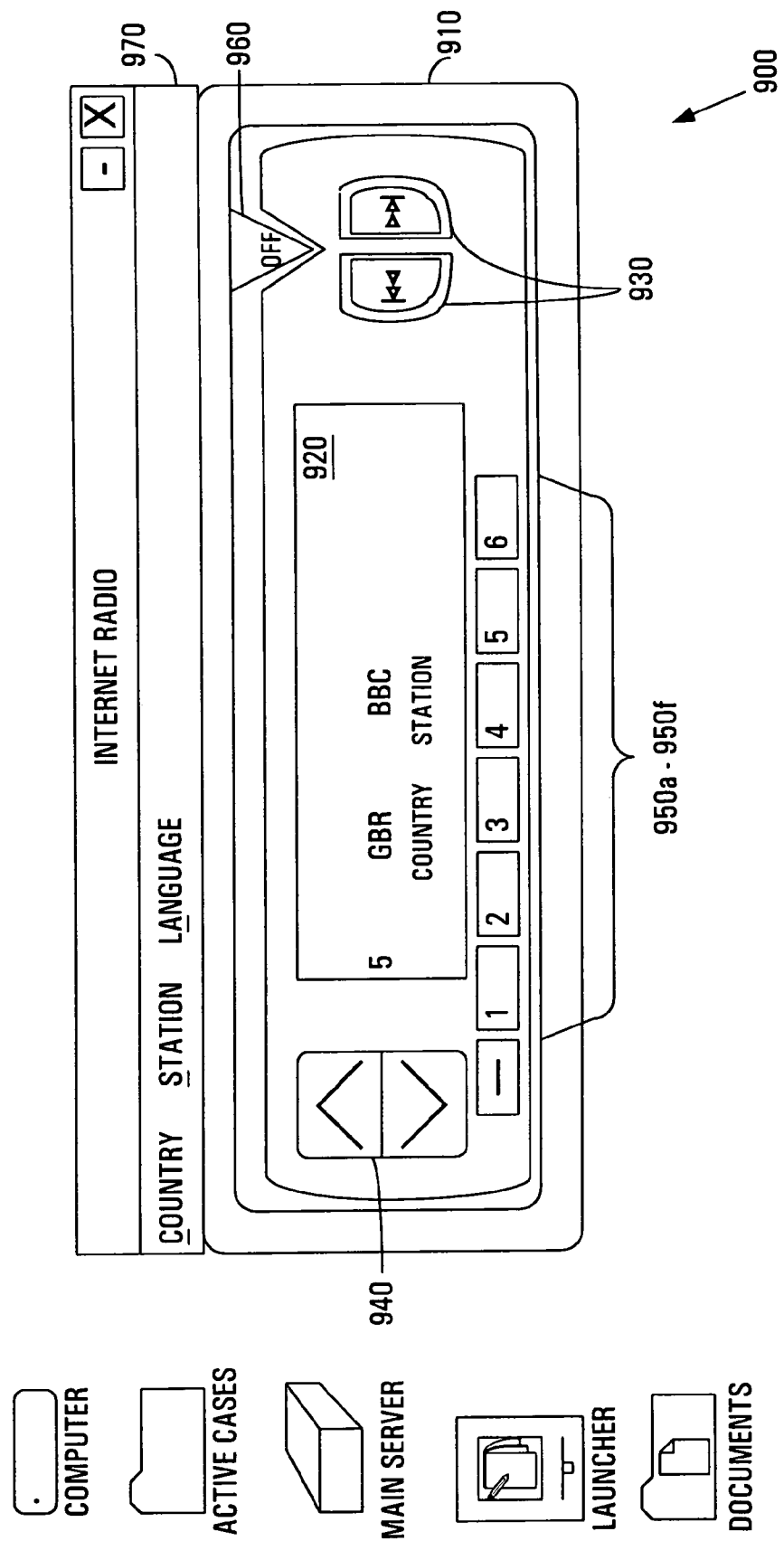
FIG. 9 is an exemplary user interface of a software-implemented Internet radio software with chaincasting capability according to the present invention.

FIG. 9 is an exemplary graphical user interface (GUI) 900 of a software Internet radio device with chaincasting capability according to the present invention. Using the GUI 900, a user can select radio programs that are chaincasted by primary broadcast server of the present invention. As illustrated, GUI 900 includes a window for displaying an image 910 resembling a real radio. Image 910 includes a display region 920 for displaying a pre-programmed channel number, the country of origin of the selected radio program and the name of the selected radio broadcaster. In the illustrated embodiment, BBC of Great Britain corresponding to pre-programmed channel number 5 is displayed in region 920.

GUI 900 further includes channel scanning buttons 930 that are responsive to user inputs. In the one embodiment, when the channel scanning buttons 930 are "clicked" by the user, the IRRT will signal the CCM that a different radio program is selected. The CCM will then instruct a PIT or another IRRT carrying data packets corresponding to the newly selected radio program to forward the data packets to the IRRT. GUI 900 further includes a volume control button 940 responsive to user inputs for adjusting the rendering volume. GUI 900 further provides a number of channel programming buttons 950a-950f configurable for selecting a pre-programmed radio broadcaster. For example, if a user configures the button 950e to correspond to a particular radio station, the IRRT will send a signal to the CCM indicating the station selected, and the CCM will instruct a PIT or another IRRT carrying that particular station to forward data packets to the IRRT.

GUI 900 further includes a tool bar 970 through which the user may access a list of available radio stations. In the illustrated embodiment, the radio stations are sorted by country names, languages and station names such that a user can select a radio station according to its country, language, or station name.

Ham Radio Mode Communications Using the Internet Radio Device

Figure 11:
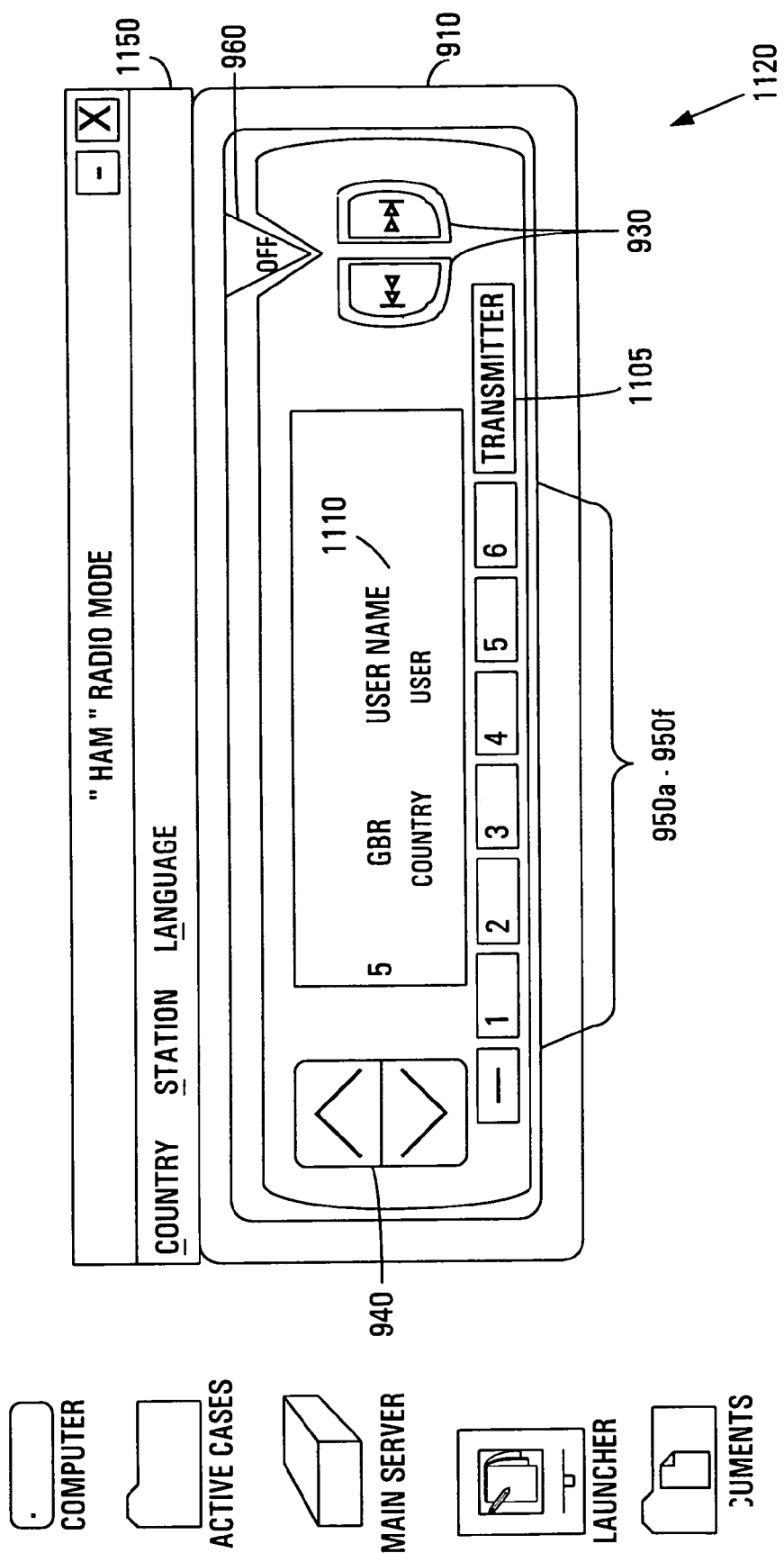
FIG. 11 is a graphical user interface of a radio device in accordance with one embodiment of the present invention for Ham radio mode.

FIG. 11 illustrates a graphical user interface (GUI) 1120 used by an alternate embodiment of the Internet radio device of the present invention. In this embodiment, called Ham radio mode, one Internet radio device is allowed to communicate (e.g., transmit information to and receive information from) with another Internet radio device. The GUI 1120 used in this embodiment is similar to the GUI 900 of FIG. 9 except as described differently herein.

GUI 1120 contains a display region 1110 in which a listing of registered radio devices can be displayed according to a selection criterion as set by user-controlled control bar 1150. Within control bar 1150, the user can select to display all radio devices by their registered country, language or name, etc. After the selection is made, all registered radio devices (e.g., registered with the CMM 850) fitting that selection are displayed in list form in display region 1150. The user can then select one of those listed radio devices, using up and down scroll keys 940 to scroll through the listing. The radio device running the GUI 1150 can then communicate with the selected other radio device once a particular radio device from the listing is selected. The information (e.g., audio signals) transmitted via the Internet from the selected other radio device can be received and rendered audible on the radio device running the GUI 1150. Also, a transmit key 1105 can be used on the radio device running the GUI 1150 to communicate audio signals to the selected other radio device via the Internet. When transmitting audio signals, the microphone 109 (FIG. 2) is used to capture the user's voice and the radio device then digitizes and encodes the audio signals for transmission over the Internet.

In the exemplary GUI 1150 of FIG. 11, the selected radio device is called "USER_NAME" and its country is GBR. Although not shown, its language could be "English." A radio device can register with more than one language.

FIG. 12 illustrates a block diagram of the chaincast broadcast architecture in one embodiment of the present invention for supporting Ham radio broadcasting modes, as described with respect to FIG. 11. In this configuration, a first radio device (called "user 1") is treated as a primary broadcast server 1210*b* and communicates with another, second radio device, 1220*a* which acts as an IRRT device to receive signals broadcast over the Internet from the first radio device 1210*b*. The first radio device 1210*b* registers with the PITS 855 of the CMM 850 in the fashion described above. Also in this configuration, the second radio device (called "user 2") is also treated as a primary broadcast server 1220*b* and communicates with the first radio device, 1210*a* which acts as an IRRT device to receive signals broadcast over the Internet from the second radio device 1220*b*. The second radio device 1220*b* registers with the PITS 855 of the CMM 850 in the fashion described above.

It is appreciated that element 1210*a* and element 1210*b* are the same device but element 1210*a* represents the first radio device in its capacity as a primary broadcast server (e.g., to broadcast audio signals) and element 1210*b* represents the first radio device in its capacity as an IRRT (e.g., to receive audio signals). Moreover, it is appreciated that element 1220*a* and element 1220*b* are the same device but element 1220*a* represents the second radio device in its capacity as a primary broadcast server (e.g., to broadcast audio signals) and element 1220*b* represents the second radio device in its capacity as an IRRT (e.g., to receive audio signals). It is appreciated that the information exchanged between radio devices in Ham radio mode is not limited to audio signals and can be audio signals, video signals, multi-media content signals and/or other HTML documents or Web pages.

Figure 12A:
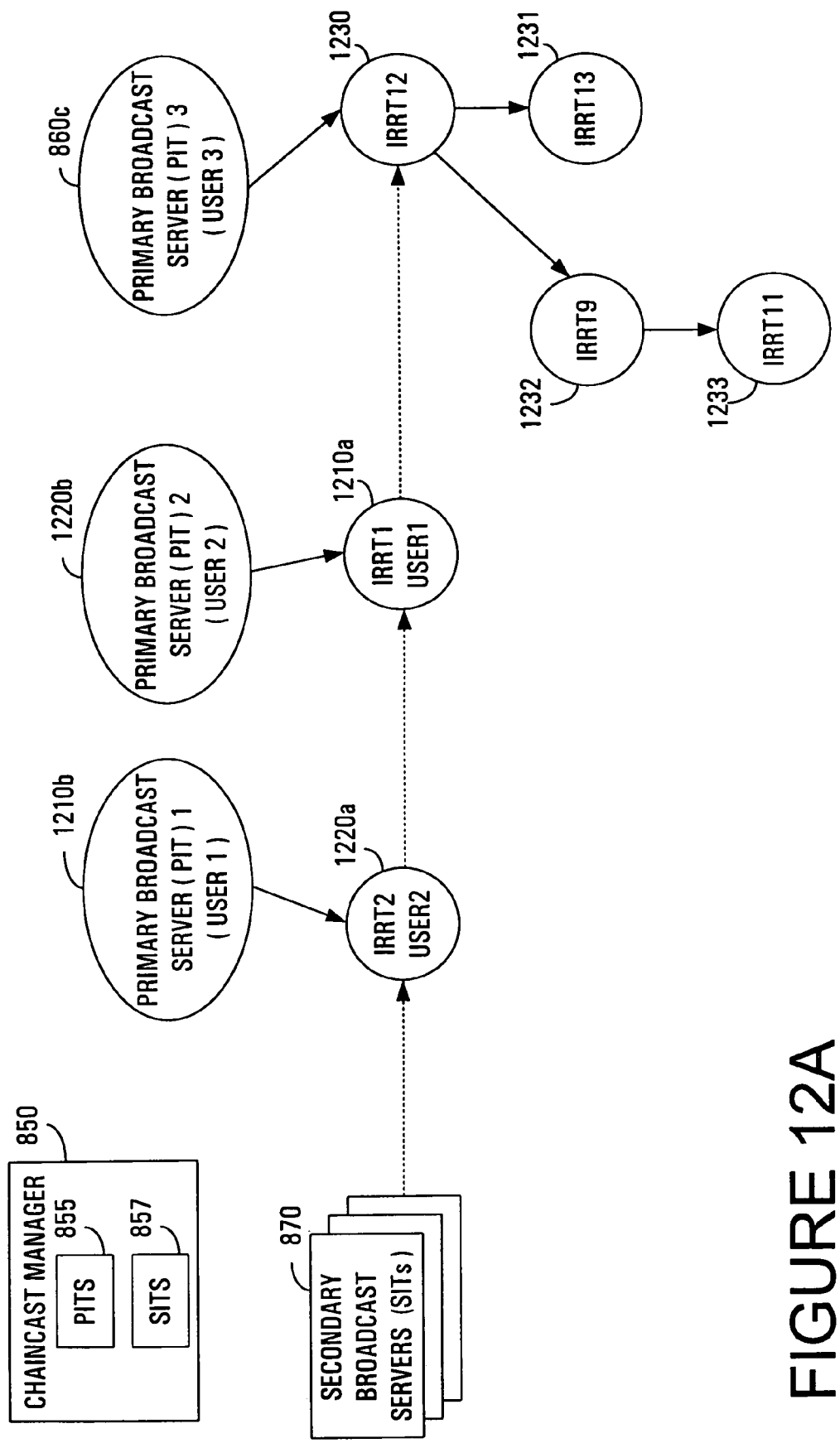
FIG. 12A is a logical block diagram of the chaincasting communication architecture for Ham radio mode communications between radio devices of one embodiment of the present invention.
Figure 12B:
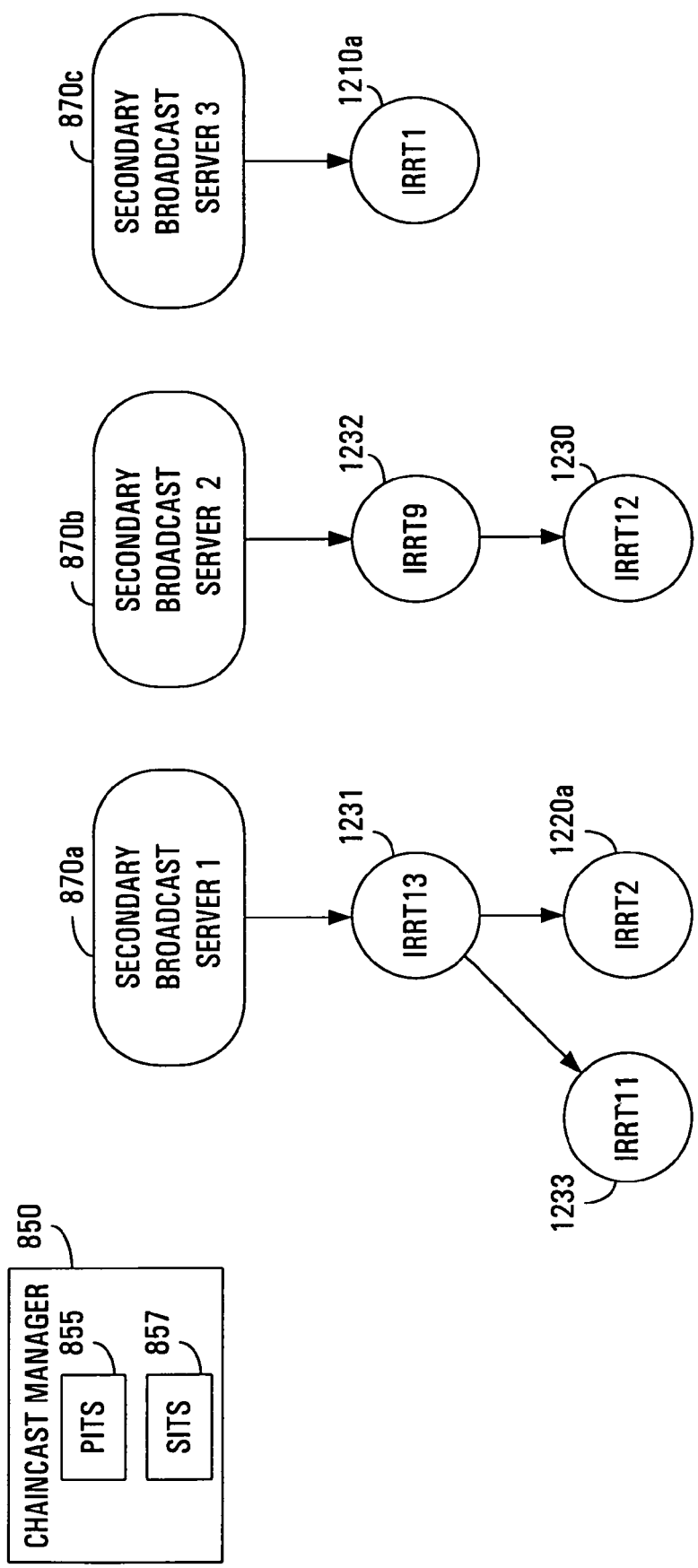
FIG. 12B illustrates a chaincast communication configuration for the secondary broadcast servers which can operate in parallel with the transmissions of the primary broadcast servers of FIG. 12A.

FIG. 12B illustrates a chaincast communication configuration for the secondary broadcast servers which can operate in parallel with the transmissions of the primary broadcast servers 1210*b*, 1220*b* and 860*c* of FIG. 12A. In other words, the chaincast groups and the communication of the secondary information transmitted among these groups can operate in parallel with the chaincast groups of the primary information shown in FIG. 12A. The chaincast groups can be different between those set up for primary information and those set up for secondary information because the PITS 855 and the SITS 857 are separate. Applying the Internet radio example, as different Internet radios receive their radio programming (e.g., the primary information), these devices can also receive secondary information broadcasts (e.g., advertising content in audio, video or HTML formats). The PITS 855 controls the radio broadcasting while the SITS 857 controls the advertising transmissions.

As shown in FIG. 12B, the SITS 857 controls the communication of secondary information between the secondary broadcast servers 870*a*-870*c*. Server 870*a* chaincasts within Internet radio devices 1231, 1233 and 1220*a*. Server 870*b* chaincasts within Internet radio devices 1232 and 1230. Server 870*c* communicates with Internet radio 1210. These chaincast groups can exist in parallel with the chaincast groups shown in FIG. 12A which represent the primary information broadcast (e.g., the radio programming). It is appreciated that the information scheduled by the SITS 857 is done independently of the Internet radio devices.

The preferred embodiment of the present invention, a chaincast system and method for communicating digital broadcast content to multiple users, pseudo simultaneously, without being constrained to the bandwidth of the server-to-Internet connection, is described. While the present invention has been described in particular embodiments, it should be appreciated that the present invention should not be construed as limited by such embodiments, but rather construed according to the below claims.

What is claimed is:

1. A method of transmitting broadcast information over the Internet, said method comprising:

registering with a broadcast manager;

receiving from said broadcast manager a list comprising a plurality of different content selections;

sending to said broadcast manager a content selection;

after said sending said content selection, establishing a communication connection with a broadcast source in response to control information from said broadcast manager;

based on said content selection, receiving broadcast information representing said content selection to render to a first user via said communication connection from said broadcast source that is receiving, buffering, and rendering to a second user said broadcast information;

providing a buffer comprising a first portion and a second portion;

storing said broadcast information to be rendered in said first portion of said buffer;

storing said broadcast information that has been rendered and may be retransmitted in said second portion of said buffer;

separating said first and second portions with a rendering pointer, which points to said broadcast information currently being rendered;

if said broadcast information in said first portion of said buffer falls below a first predetermined threshold, sending a first message to said broadcast source to transmit more broadcast information, wherein said first predetermined threshold is indicated with a first pointer; and if said broadcast information in said first portion of said buffer falls below said first predetermined threshold and a second predetermined threshold, sending a second message to said broadcast manager to assign a different broadcast source, wherein said second predetermined threshold is indicated with a second pointer.

2. The method as described in claim 1 wherein said broadcast information is digitally encoded audio information representing audio programs.

3. The method as described in claim 2 further comprising rendering a graphical user interface display of a radio device for allowing a user to request which broadcast information to receive.

4. The method as described in claim 1 wherein said broadcast information is digitally encoded audio/visual information representing television programs.

5. The method as described in claim 1 wherein said broadcast information is digitally encoded audio/visual information representing audio/visual programs.

6. An apparatus comprising:

means for receiving from a broadcast manager a list comprising a plurality of different content selections, for sending to said broadcast manager a content selection, and for establishing a connection with a broadcast source in response to control information from said broadcast manager after said sending said content selection to said broadcast manager;

means for receiving and rendering to a first user broadcast information retransmitted over the Internet via said connection from said broadcast source that is receiving, buffering, and rendering to a second user said broadcast information;

means for selectively retransmitting said broadcast information based on control information from said broadcast manager;

a buffer comprising a first portion for storing said broadcast information to be rendered, a second portion for storing said broadcast information that has been rendered and may be retransmitted, and a rendering pointer for separating said first and second portions, wherein said rendering pointer points to said broadcast information currently being rendered; and means for sending a first message to said broadcast source to transmit more broadcast information if said broadcast information in said first portion of said buffer falls below a first predetermined threshold and for sending a second message to said broadcast manager to assign a different broadcast source if said broadcast information in said first portion of said buffer falls below said first predetermined threshold and a second predetermined threshold, wherein said first predetermined threshold is indicated with a first pointer, and wherein said second predetermined threshold is indicated with a second pointer.

7. The apparatus as described in claim 6 wherein said broadcast information is digitally encoded audio information representing audio programs.

8. The apparatus as described in claim 7 further comprising means for rendering a graphical user interface display of a radio device for allowing a user to request which broadcast information to receive.

9. The apparatus as described in claim 6 wherein said broadcast information is digitally encoded audio/visual information representing television programs.

10. The apparatus as described in claim 6 wherein said broadcast information is digitally encoded audio/visual information representing audio/visual programs.

11. An apparatus comprising:

means for registering a broadcast target to receive broadcast information;

means for sending a list comprising a plurality of different content selections to said broadcast target;

means for receiving from said broadcast target a content selection;

means for causing said broadcast target to establish a connection with a broadcast source after receiving said content selection;

means for instructing based on said content selection said broadcast source, which is receiving, buffering, and rendering to a first user broadcast information representing said content selection, to retransmit said broadcast information via said connection to said broadcast target for rendering to a second user; and means for receiving messages from said broadcast target and said broadcast source concerning each respective buffer of said broadcast target and said broadcast source, wherein each respective buffer comprises a first portion for storing said broadcast information to be rendered, a second portion for storing said broadcast information that has been rendered and may be retransmitted, and a rendering pointer for separating said first and second portions, wherein said rendering pointer points broadcast information currently being rendered, wherein said broadcast target sends a first message to said broadcast source to transmit more broadcast information if said broadcast information in paid first portion of said buffer falls below a first predetermined threshold, wherein said broadcast target sends a second message to said means for receiving messages to assign a different broadcast source if said broadcast information in said first portion of said buffer falls below said first predetermined threshold and a second predetermined threshold, wherein said first predetermined threshold is indicated with a first pointer, and wherein said second predetermined threshold is indicated with a second pointer.

12. The apparatus as described in claim 11 wherein said broadcast information is digitally encoded audio information representing audio programs.

13. The apparatus as described in claim 11 wherein said broadcast information is digitally encoded audio/visual information representing television programs.

14. The apparatus as described in claim 11 wherein said broadcast information is digitally encoded audio/visual information representing audio/visual programs.

15. The apparatus as described in claim 11 further comprising:

means for instructing based on said content selection said broadcast target to retransmit said broadcast information to a second broadcast target for rendering to a third user.

16. The apparatus as described in claim 15 further comprising:

means for instructing based on said content selection said second broadcast target to retransmit said broadcast information to a third broadcast target for rendering to a fourth user.

17. The apparatus as described in claim 16 further comprising:
   means for instructing based on said content selection said broadcast target to retransmit said broadcast information to said third broadcast target for rendering to said fourth user.

18. The apparatus as described in claim 17 further comprising:
   means for instructing based on said content selection said broadcast source to retransmit said broadcast information to said second broadcast target for rendering to said third user.

19. The apparatus as described in claim 18 further comprising:
   means for instructing based on said content selection said broadcast source to retransmit said broadcast information to said third broadcast target for rendering to said fourth user.

20. The apparatus as described in claim 11 further comprising: means for storing said list.

* * * * *